(12) United States Patent
Birkler

(10) Patent No.: US 8,514,190 B2
(45) Date of Patent: Aug. 20, 2013

(54) DISPLAYS FOR ELECTRONIC DEVICES THAT DETECT AND RESPOND TO THE CONTOUR AND/OR HEIGHT PROFILE OF USER INPUT OBJECTS

(75) Inventor: Paul Joergen Birkler, Redwood City, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 360 days.

(21) Appl. No.: 12/899,037

(22) Filed: Oct. 6, 2010

(65) Prior Publication Data
US 2012/0086647 A1    Apr. 12, 2012

(51) Int. Cl.
*G06F 3/041*    (2006.01)

(52) U.S. Cl.
USPC ........................................ 345/173; 178/18.07

(58) Field of Classification Search
USPC ........... 345/173–178, 104; 178/18.01–18.09, 178/18.11
See application file for complete search history.

(56) References Cited

U.S. PATENT DOCUMENTS

| | | | |
|---|---|---|---|
| 5,105,186 A | 4/1992 | May | |
| 7,230,608 B2 | 6/2007 | Cok | |
| 2006/0192766 A1 | 8/2006 | Nakamura et al. | |
| 2006/0214892 A1 | 9/2006 | Harada et al. | |
| 2007/0097096 A1 | 5/2007 | Rosenberg | |
| 2008/0012835 A1* | 1/2008 | Rimon et al. | 345/173 |
| 2008/0048996 A1 | 2/2008 | Hu et al. | |
| 2008/0074401 A1 | 3/2008 | Chung et al. | |
| 2008/0098331 A1 | 4/2008 | Novick et al. | |
| 2008/0121442 A1 | 5/2008 | Boer et al. | |
| 2008/0122803 A1 | 5/2008 | Izadi et al. | |
| 2008/0284746 A1* | 11/2008 | Kao et al. | 345/173 |
| 2008/0297487 A1 | 12/2008 | Hotelling et al. | |
| 2009/0146957 A1 | 6/2009 | Lee et al. | |
| 2009/0231282 A1 | 9/2009 | Fyke | |
| 2010/0110002 A1 | 5/2010 | Burstrom et al. | |

FOREIGN PATENT DOCUMENTS

| | | |
|---|---|---|
| CN | 1846248 A | 10/2006 |
| CN | 101169689 A | 4/2008 |
| EP | 1 615 109 A2 | 1/2006 |
| EP | 1 615 109 A3 | 10/2006 |

(Continued)

OTHER PUBLICATIONS

"How do touch-screen monitors know where you're touching?" http://computer.howstuffworks.com, 2 pages, 2008.

(Continued)

*Primary Examiner* — Stephen Sherman
(74) *Attorney, Agent, or Firm* — Myers Bigel Sibley & Sajovec, P.A.

(57) ABSTRACT

An electronic device includes a touch-sensitive display screen including an array of electromagnetic radiation detectors. The array of electromagnetic radiation detectors is configured to generate an image signal that represents an image of a user input object that is closely spaced to the display, and to generate a touch signal in response to the display screen being touched by the user input object. The electronic device further includes a controller circuit that is configured to display a plurality of keys forming a keyboard and to display characters on the keys. The controller identifies from the image signal a size and/or an angular orientation of the user input object relative to the display screen. The controller identifies a user's selection among characters indicated on the keyboard keys in response to the identified size and/or the angular orientation of the user input object and in response to the touch signal, and outputs character data corresponding to the identified user selected character.

18 Claims, 24 Drawing Sheets

(56) References Cited

FOREIGN PATENT DOCUMENTS

| WO | WO 03/073159 A1 | 9/2003 |
|----|-----------------|--------|
| WO | WO 2005/008412 A2 | 1/2005 |
| WO | WO 2009/027773 A1 | 3/2009 |
| WO | WO 2010/018577 A2 | 2/2010 |

OTHER PUBLICATIONS

Wilson, Andrew D., "TouchLight: An Imagining Touch Screen and Display for Gesture-Based Interaction," *ICMI'04*, Oct. 13-15, 2004, 8 pages.

The International Search Report and the Written Opinion for PCT/US2009/002433 mailed Mar. 24, 2010.

International Search Report and Written Opinion, PCT International Application No. PCT/US2009/064893, Mar. 26, 2010.

Wikipedia, online encyclopedia "Touchscreen" Definition from Wikipedia.org, (http://en.wikipedia.orq/wiki/Touchscreen) Accessed Jun. 2, 2009 (8 pages).

Shahram Izadi; "ThinSight: Integrated Optical Multi-touch Sensing through Thin Form-factor Displays"; XP007905449; vol. 252, Aug. 4, 2007 http://portal.acm.org/citation.cfm?id=1278240. 1278246.

Search Report for PCT/IB2011/002123 date of mailing Jan. 27, 2012.

Steve Hodges et al.; ThinSight: Versatile Multi-touch Sensing for Thin Form-factor Display; XP007905450; *Microsoft Research Cambridge*; pp. 259-268; UIST 07, Oct. 7-10, 2007.

The International Search Report and the Written Opinion for International Application No. PCT/IB2011/002123, mailed Mar. 26, 2012.

International Preliminary Report on Patentability Corresponding to International Application No. PCT/IB2011/002123; Date of Mailing: Apr. 18, 2013; 14 Pages.

Chinese First Office Action Corresponding to Chinese Patent Application No. 200980159219.3; Date of Issuance: Mar. 5, 2013; Foreign Text, 2 Pages, English Translation Thereof, 8 Pages.

\* cited by examiner

DISPLAYS FOR ELECTRONIC DEVICES THAT DETECT AND RESPOND TO THE CONTOUR AND/OR HEIGHT PROFILE OF USER INPUT OBJECTS

RELATED APPLICATION(S)

This application is related to co-pending and commonly assigned U.S. application Ser. No. 12/250,108, entitled "User Input Displays For Mobile Devices," filed Oct. 13, 2008, and to co-pending and commonly assigned U.S. application Ser. No. 12/271,239, entitled "Displays for Mobile Devices that Detect User Inputs Using Touch and Tracking of User Input Objects," filed Nov. 14, 2008, and to co-pending and commonly assigned U.S. application Ser. No. 12/464,403, "Displays for Electronic Devices the Detect and Respond to the Size and/or Angular Orientation of User Input Objects," filed May 12, 2009, the disclosures of each of which are incorporated herein by reference in their entirety.

BACKGROUND

The present invention relates to displays for an electronic device, and in particular, to displays for receiving user input.

Various technologies are available to detect stylus and/or finger contact in touch sensitive displays. For example, a resistive touchscreen panel includes two spaced-apart, thin metallic electrically conductive and resistive layers. When a user input object touches the panel, the layers are connected, causing a change in an electrical current. This change in electrical current is detected as a user input contact event. Resistive touchscreens are typically relatively precise, but may not be sufficiently sensitive, especially if the user's finger is used to contact the touch screen.

A capacitive touchscreen is typically coated with a material, such as indium tin oxide, that conducts a continuous electrical current across a sensor. The sensor exhibits a controlled field of stored electrons in both horizontal and vertical axes to achieve a capacitance. When the sensor's capacitance field is altered by another capacitance field, e.g., a user's finger, electronic circuits located at each corner of the panel measure the distortion and identify a location of the disturbance. Capacitive touch screens have a relatively high sensitivity, but the precision with which the location of the event is detected can be low.

A side-optical touchscreen uses a grid of optical detectors on top of the surface of the display. Light is sent from one side to the other and received by detectors both horizontally and vertically. The beams of light are broken when a finger or stylus is in close proximity such that the location can be translated into coordinates by the detectors. However, since the light sources and the detectors need to be placed on top of the display, this configuration builds height that is generally not desirable in mobile devices.

Another type of optical touchscreen uses the total internal reflection principle. A refractive medium is filled with light, and when a finger or other object is pressed against the surface, the internal reflection light path is interrupted, which results in light being reflected outside of the refractive medium. The light outside the refractive medium can be detected by a camera. Refraction-optical touchscreens generally have good sensitivity and precision. However, the space required for light sources and the refractive medium may increase the dimensions of the display and also limit the contrast of the display because it is combined with a camera, and therefore, this type of optical touchscreen may not be practical for use with hand-held devices.

Moreover, touchscreens may not be able to operate using the same general protocols as a mouse-based user interface because user inputs may be generated only upon contact with the screen. Thus, it may be more difficult for a user to track movement of an icon, for example, to select a region, than can be accomplished with a mouse. However, a mouse input device may not be desirable to use with a compact, hand-held device.

SUMMARY

An electronic device according to some embodiments includes a touch-sensitive display screen including an array of electromagnetic radiation emitters and electromagnetic radiation detectors. The array of electromagnetic radiation detectors is configured to generate an image signal that represents an image of a user input object that is closely spaced to the display responsive to detected electromagnetic radiation that is reflected by the user input object. A controller circuit is configured to control activation of the array of electromagnetic radiation emitters so that at least a portion of the array of electromagnetic radiation emitters are inactive in an absence of detecting electromagnetic radiation reflected by the user input object, and to selectively activate ones of the array of electromagnetic radiation emitters responsive to the array of electromagnetic radiation detectors detecting electromagnetic radiation that is reflected by the user input object.

In some further embodiments, the selectively activated ones of the plurality of the array of electromagnetic radiation emitters are proximate the detected electromagnetic radiation reflected by the user input object.

In some further embodiments, the electively activated ones of the plurality of the array of electromagnetic radiation emitters are proximate a perimeter of the electromagnetic radiation reflected by the user input object.

In some further embodiments, the controller circuit is configured to generate a contour profile of the user input object that approximates a contour curve of a surface of the user input object and is responsive to an amount of electromagnetic radiation detected by respective ones of the electromagnetic radiation detectors.

In some further embodiments, the controller circuit is configured to generate a height profile of the user input object that approximates a distance between a surface of the user input object and the display and is responsive to an amount of electromagnetic radiation detected by respective ones of the electromagnetic radiation detectors.

In some further embodiments, the controller circuit is configured to activate a first set of one or more of the electromagnetic radiation emitters and to generate a first electromagnetic radiation profile responsive to electromagnetic radiation from the first set of one or more electromagnetic radiation emitters that is reflected by the user input object and detected by the array of electromagnetic radiation detectors. The controller circuit is configured to activate a second set of one or more of the electromagnetic radiation emitters that is different from the first set of one or more of the electromagnetic radiation emitters and to generate a second electromagnetic radiation profile responsive to electromagnetic radiation from the second set of one or more electromagnetic radiation emitters that is reflected by the user input object and detected by the array of electromagnetic radiation detectors. The controller circuit is configured to identify a contour profile of the user input object based on the first and second electromagnetic radiation profiles.

In some further embodiments, the controller circuit is configured to display on the display screen a plurality of keys forming a keyboard and to display characters on the keys, to identify from the first and second electromagnetic radiation profiles a contour profile comprising a contour of the user input object relative to the display screen, to identify a user's selection among characters indicated on the keyboard keys in response to the identified contour profile of the user input object, and to output character data corresponding to the identified user selected character. The display may be configured to generate a touch signal in response to the display screen being touched by the user input object, and the controller circuit may be configured to further identify the user's selection among characters indicated on the keyboard keys in response to a touch signal together with the identified contour profile of the user input object. The controller circuit may be further configured to display at least two different characters on each of a plurality of the keyboard keys, and to identify a user's selection among the characters displayed on a selected one of the multi-character keys in response to the identified contour profile of the user input object that is selecting the key. The controller circuit may be further configured to identify a portion of the user input object that is nearest to the display responsive to the contour profile and to identify a first one of the multiple characters on the selected key that occurs adjacent the portion of the user input object that is nearest to the display as being the user selected character.

In some further embodiments, the controller circuit is configured to modify the displayed size of at least some of the keyboard keys in response to an identified size of the user input object based on the image signal. The controller circuit may be further configured to display a first plurality of keys of a QWERTY keyboard on the display screen in response to identifying a first threshold size of the user input object and to replace the displayed first plurality of keys with a second plurality of keys of the QWERTY keyboard on the display screen in response to identifying a second threshold size of the user input object, wherein the second threshold size is larger than the first threshold size and the second plurality of keys is less than the first plurality of keys.

In some further embodiments, a method of operating a touch-sensitive display includes an array of electromagnetic radiation emitters and electromagnetic radiation detectors. The method includes activating a reduced number of electromagnetic radiation emitters in an absence of electromagnetic radiation detected by the electromagnetic radiation detectors. The electromagnetic radiation emitters are selectively activated responsive to a detection of electromagnetic radiation reflected by a user input object. An image signal is generated representing an acquired image of the user input object. A user selection of a character and/or icon is identified responsive to the acquired image of the user input object.

In some further embodiments, the selectively activated ones of the plurality of the array of electromagnetic radiation emitters are proximate the detected electromagnetic radiation reflected by the user input object.

In some further embodiments, the electively activated ones of the plurality of the array of electromagnetic radiation emitters are proximate a perimeter of the electromagnetic radiation reflected by the user input object.

In some further embodiments, a contour profile of the user input object is generated that approximates a contour curve of a surface of the user input object and is responsive to an amount of electromagnetic radiation detected by respective ones of the electromagnetic radiation detectors.

In some further embodiments, a height profile of the user input object that approximates a distance between a surface of the user input object and the display and is responsive to an amount of electromagnetic radiation detected by respective ones of the electromagnetic radiation detectors.

In some further embodiments, a first set of one or more of the electromagnetic radiation emitters is activated, and a first electromagnetic radiation profile is generated responsive to electromagnetic radiation from the first set of one or more electromagnetic radiation emitters that is reflected by the user input object and detected by the array of electromagnetic radiation detectors. A second set of one or more of the electromagnetic radiation emitters that is different from the first set of one or more of the electromagnetic radiation emitters is activated. A second electromagnetic radiation profile is generated responsive to electromagnetic radiation from the second set of one or more electromagnetic radiation emitters that is reflected by the user input object and detected by the array of electromagnetic radiation detectors. A contour profile of the user input object is identified based on the first and second electromagnetic radiation profiles. A plurality of keys forming a keyboard and characters on the keys is displayed on the display screen. A user's selection among characters indicated on the keyboard keys is identified in response to the identified contour profile of the user input object. Character data is output corresponding to the identified user selected character. A touch signal may be generated in response to the display screen being touched by the user input object, and the user's selection among characters indicated on the keyboard keys may be identified in response to a touch signal together with the identified contour profile of the user input object.

BRIEF DESCRIPTION OF THE DRAWINGS

The following drawings, which are incorporated in and constitute a part of the specification, illustrate embodiments of the invention and, together with the description, serve to explain principles of the invention.

DETAILED DESCRIPTION

Figure 1:
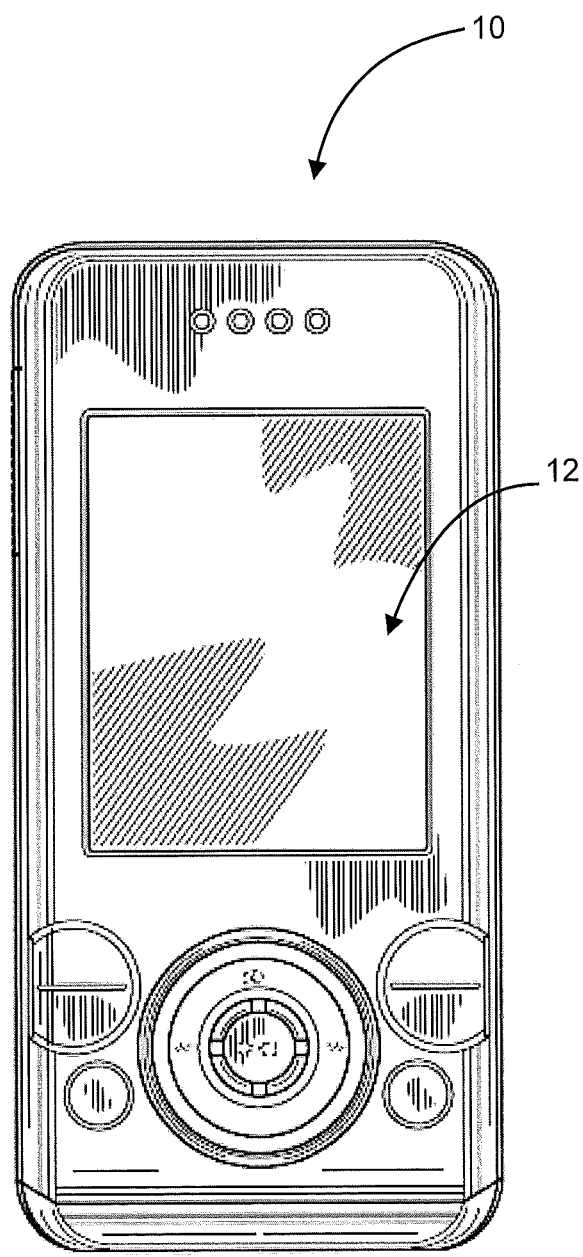
FIG. 1 is a front view of a mobile communications device having a display according to embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

As used herein, a "mobile communication terminal" or "terminal" includes, but is not limited to, a communication device that is configured to receive communication signals via a wireless interface from, for example, a cellular network, a Wide Area Network, wireless local area network (WLAN), a GPS system, and/or another RF communication device.

As used herein, a "display" includes, but is not limited to, a device capable of providing a visual representation, such as graphics, lighting or back-lighting for displaying information and/or for aesthetic purposes.

Figure 2:
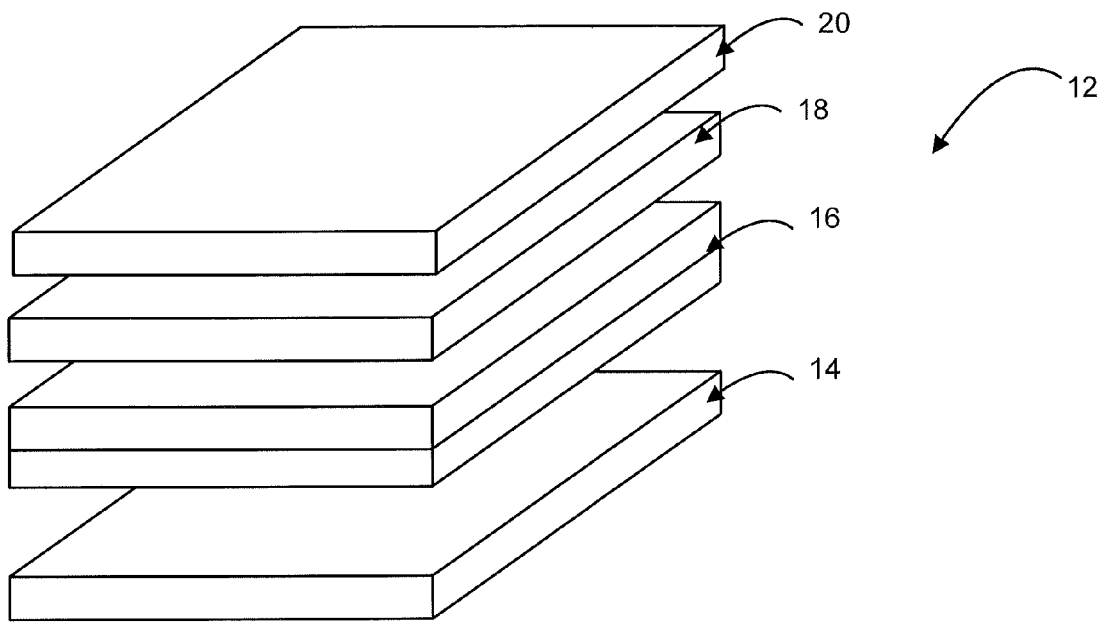
FIG. 2 is an exploded view of the display of FIG. 1.
Figure 3:
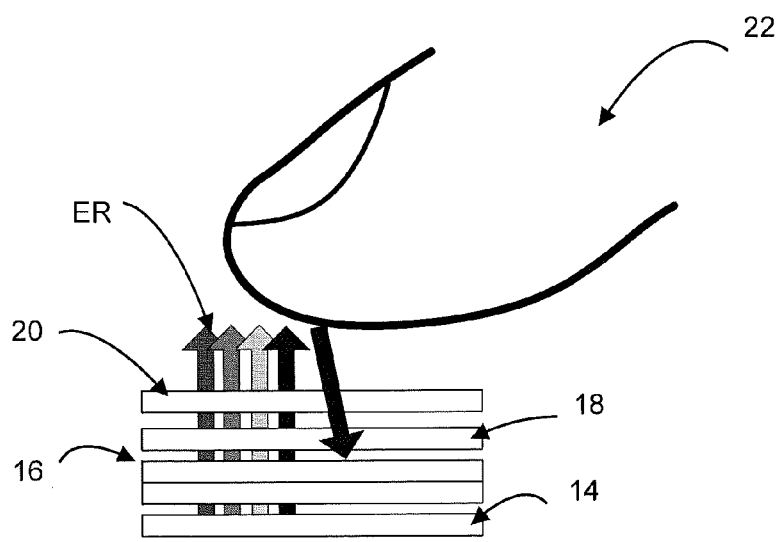
FIG. 3 is a cross sectional view of the display of FIG. 1.
Figure 4:
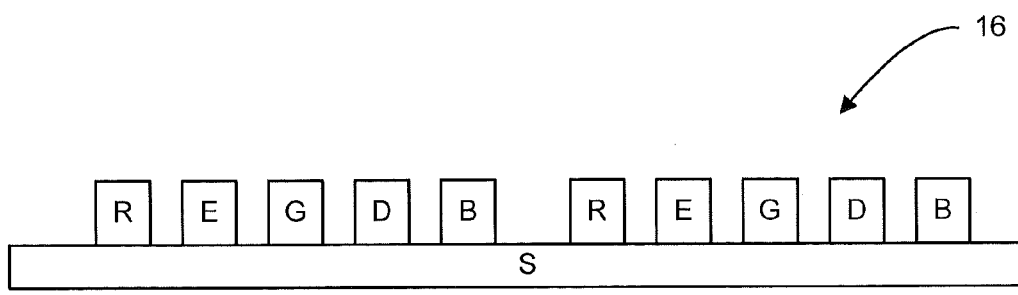
FIG. 4 is a cross sectional view of a layer of the display of FIG. 1 including electromagnetic radiation emitters and detectors according to embodiments of the present invention.

As illustrated in FIGS. 1-3, an exemplary hand-held mobile electronic device 10 includes a liquid crystal diode (LCD) display 12. The display 12 includes a backlighting layer 14, a liquid crystal layer 16, a protective layer 18 (such as glass) and a touch panel layer 20. As illustrated in FIG. 4, an alternative configuration employing organic light emitting diodes (OLEDs) can be used in which the backlighting layer 14 and/or the liquid crystal layer 16 are omitted. The display 12 of FIG. 4 includes an array of electromagnetic radiation emitters E and electromagnetic radiation detectors D on a substrate S. In some embodiments, the electromagnetic radiation emitters E and electromagnetic radiation detectors D may include infrared emitters and detectors, respectively. The substrate S also includes light emitters R, G and B, such as light emitting diodes (LEDs) or OLEDs, that are used to display pixels of various colors on the display 12.

As shown in FIG. 3, the emitters emit electromagnetic radiation ER away from the display 12. If a user input object 22, such as a finger, is positioned adjacent to (although not necessarily in contact with) the display 12, then the electromagnetic radiation ER is reflected in a direction toward the display 12. The reflected electromagnetic radiation ER can be detected by the detectors D within and/or beneath the liquid crystal layer 16. Contact between the user input object 22 and the display is not required, and the electromagnetic radiation ER can be reflected by the object 22 when the object 22 is spaced apart from the display 12.

Figures 5A, 5B, 5C, 5D:
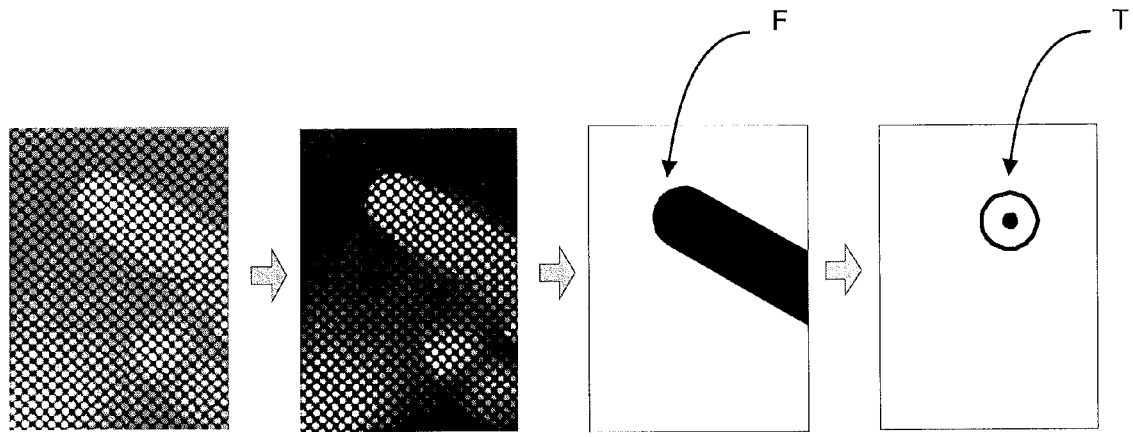
FIG. 5A is a digital image of an electromagnetic radiation profile according to embodiments of the present invention.
FIG. 5B is an enhanced image derived from the image of FIG. 5A.
FIG. 5C is a schematic illustration of an identification of a user input device using the images of FIGS. 5A-5B.
FIG. 5D is a schematic illustration of a target region identified based on the illustration of FIG. 5C.
Figure 6:
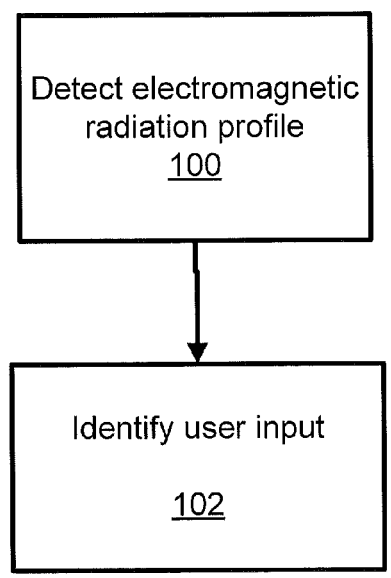
FIG. 6 is a flowchart illustrating operations according to embodiments of the current invention.

As illustrated in FIGS. 5A-5D and FIG. 6, the outputs of the electromagnetic radiation detector D can be used to generate a two dimensional image in response to the detected electromagnetic radiation profile (FIG. 5A; Block 100, FIG. 6), which can be used to identify a user input, such as a region of the display that is selected or highlighted by the user (FIG. 5D; Block 102, FIG. 6). In this configuration, a user input object, such as a finger or stylus, can be detected when the object is spaced apart and not in physical contact with the display 12.

For example, as shown in FIG. 5A, the data from the detectors D can be used to provide the image shown in FIG. 5A, which illustrates an exemplary infrared (IR) image of a user's finger. The contrast between the pixels of the image can optionally be enhanced as shown in FIG. 5B. The shape of the user's finger F can then be identified as shown in FIG. 5C. As shown in FIG. 5D, a target region T can then be identified, such as by using image analysis techniques known to those of skill in the art to identify a region from the shape of the finger F (e.g., the tip of the finger F). In some embodiments, the target region T may be indicated on the display 12 of FIGS. 1-4, e.g., by displaying an icon in the target region T. Thus, movement of the user input object or finger F can be tracked on the display 12 by displaying the icon responsive to movement of the finger F. In this configuration, various user inputs can be registered by the display without contact from the finger F.

In particular embodiments, the display 12 can further include a touch-sensitive display such that additional user inputs can be detected when a user input object contacts the display. In this configuration, user inputs to the display 12 may be used that are similar to those used in a conventional mouse environment. An icon, such as a traditional mouse arrow, can be moved when the user moves a user input object without contacting the display 12, such as is described with respect to FIGS. 5A-5D. When the user touches the display 12, another user input can be received by the electronic device 10 that may be analogous to selecting or "clicking" a mouse button at a particular location. Accordingly, the display 12 can detect motion and/or contact of a user input object to provide a user interface that is similar to a traditional mouse environment.

Although embodiments according to the present invention are described with respect to the infrared electromagnetic radiation emitters E and infrared electromagnetic radiation detectors D in FIG. 4, it should be understood that other suitable techniques can be used to provide an electromagnetic radiation profile responsive to a location of a user input object. For example, in some embodiments, the emitters E shown in FIG. 4 can be omitted, and the detectors D can be configured to detect an obstruction of background electromagnetic radiation responsive to a position of a user input object. In some embodiments, the electromagnetic radiation detectors D can be configured to detect thermal radiation, e.g., from a digit or finger of a user's hand, as an infrared (IR) signal.

Figure 7:
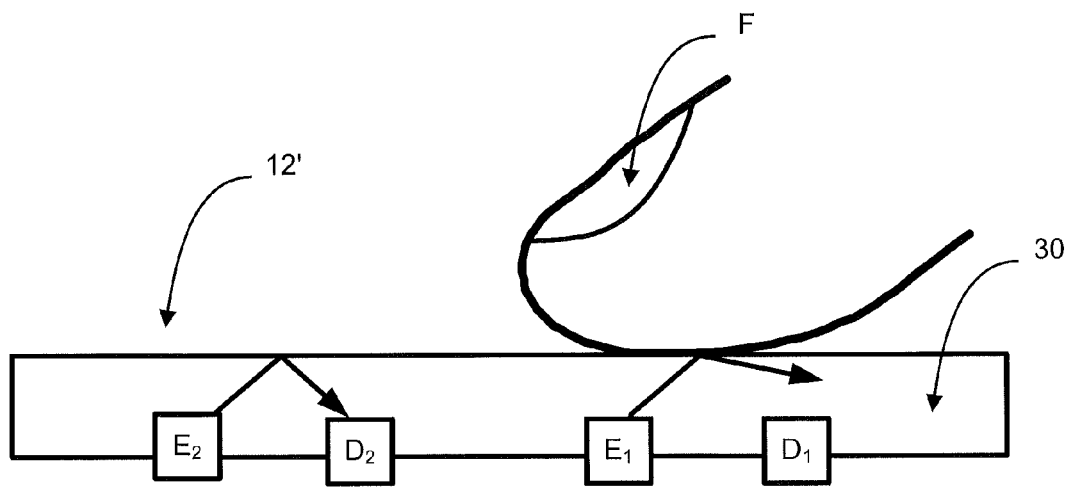
FIG. 7 is a cross sectional view of a touch-sensitive display according to some embodiments of the present invention.

According to further embodiments of the present invention, a touch-sensitive display system can be provided. As illustrated in FIG. 7, the display 12' can include an array of electromagnetic radiation emitters $E_1$, $E_2$ electromagnetic radiation detectors $D_1$, $D_2$ and a refractive medium 30. In the absence of contact from a user input object, such as a finger F and as shown with respect to the emitter $E_2$ and detector $D_2$, the emitter $E_2$ is configured to emit electromagnetic radiation toward the refractive medium 30, and the total internal reflection of the refractive medium 30 reflects the electromagnetic radiation towards the detector $D_2$. The total internal reflection of the refractive medium 30 is disturbed or changed by contact from the finger F as shown with respect to the emitter $E_1$ and detector $D_1$ such that the direction of reflected electromagnetic radiation is changed and the detector $D_1$ detects a reduced amount of electromagnetic radiation. The refractive medium 30 can be formed of any suitable material, including transparent and/or translucent plastic, elastomer materials, or glass. In some embodiments, the surface $30_S$ can include a reflective or partially reflective coating. Thus, the presence of the finger F can be detected by a reduction or elimination of the detected electromagnetic radiation in detector $D_1$.

Figure 8:
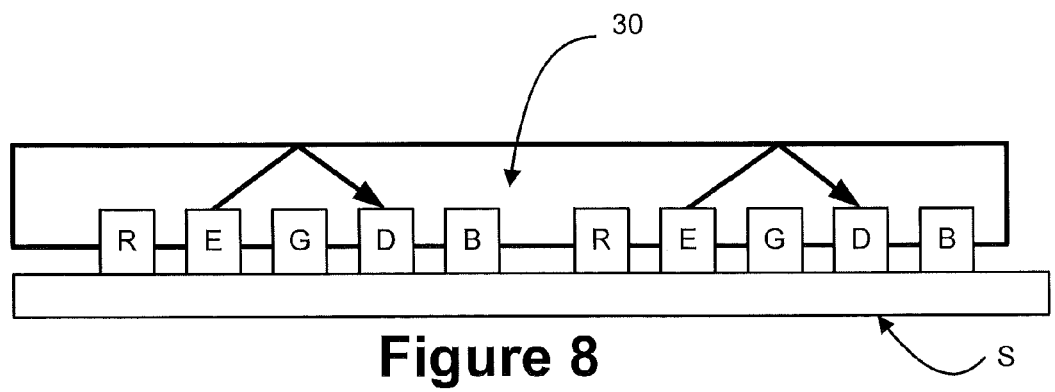
FIG. 8 is a cross sectional view of another touch-sensitive display according to some embodiments of the present invention.

In some embodiments as shown in FIG. 8, the emitters E and detectors D can be provided on a substrate S together with light emitters R, G, B for red, green and blue light respectively. The light emitters R, G, B can be LEDs or OLEDs. Accordingly, the emitters E and/or detectors D can be integrated in the display.

Figure 9:
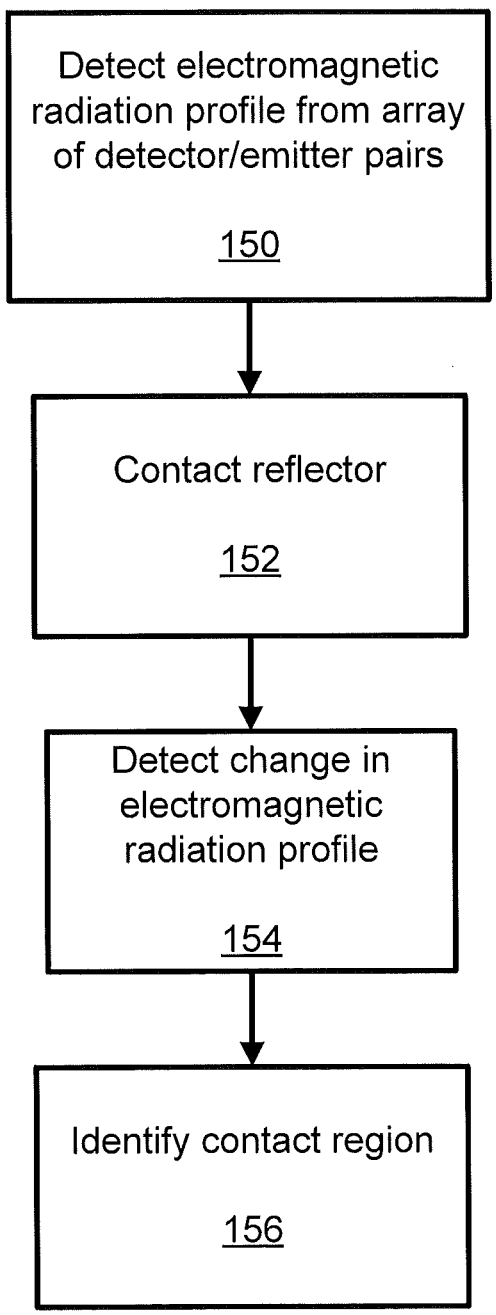
FIG. 9 is a flowchart illustrating operations according to embodiments of the current invention.

As illustrated in FIG. 9, the emitters E and detectors D can be used to detect an electromagnetic radiation profile of the display (Block 150), for example, by detecting an amount of electromagnetic radiation detected by an array of detectors D on the display 12'. The refractive medium of the display can be contacted (Block 152), and a resulting change in the electromagnetic radiation profile can be detected (Block 154). The contact region can be detected (Block 156), for example, based on an identification of the area in which the detectors detect a reduced amount of the reflected light.

In particular embodiments, the configuration shown in FIGS. 7 and 8 can include additional emitters E and detectors D that are configured to detect a user input object that is not in contact with the display 12' as is described with respect to FIGS. 2-6. The surface of the refractive medium 30 of FIGS. 7 and 8 can become reflective based on the incident angle of the electromagnetic radiation emitted by an emitter E (e.g., about 45 degrees for a plastic or glass and air interface). At other angles, the surface of the refractive medium 30 can be transmissive. Accordingly, the incident angles of the emitters E on the refractive medium 30 can be selected to provide both emitter E and detector D pairs that are configured as described with respect to FIGS. 7 and 8 (i.e., to detect reflected electromagnetic radiation and disruptions thereof by contact with the refractive medium 30) and emitters E that emit or transmit electromagnetic radiation through the refractive medium 30 as described with respect to FIGS. 2-6 (i.e., to detect user input objects that are spaced apart from the display 12, 12').

Figure 10:
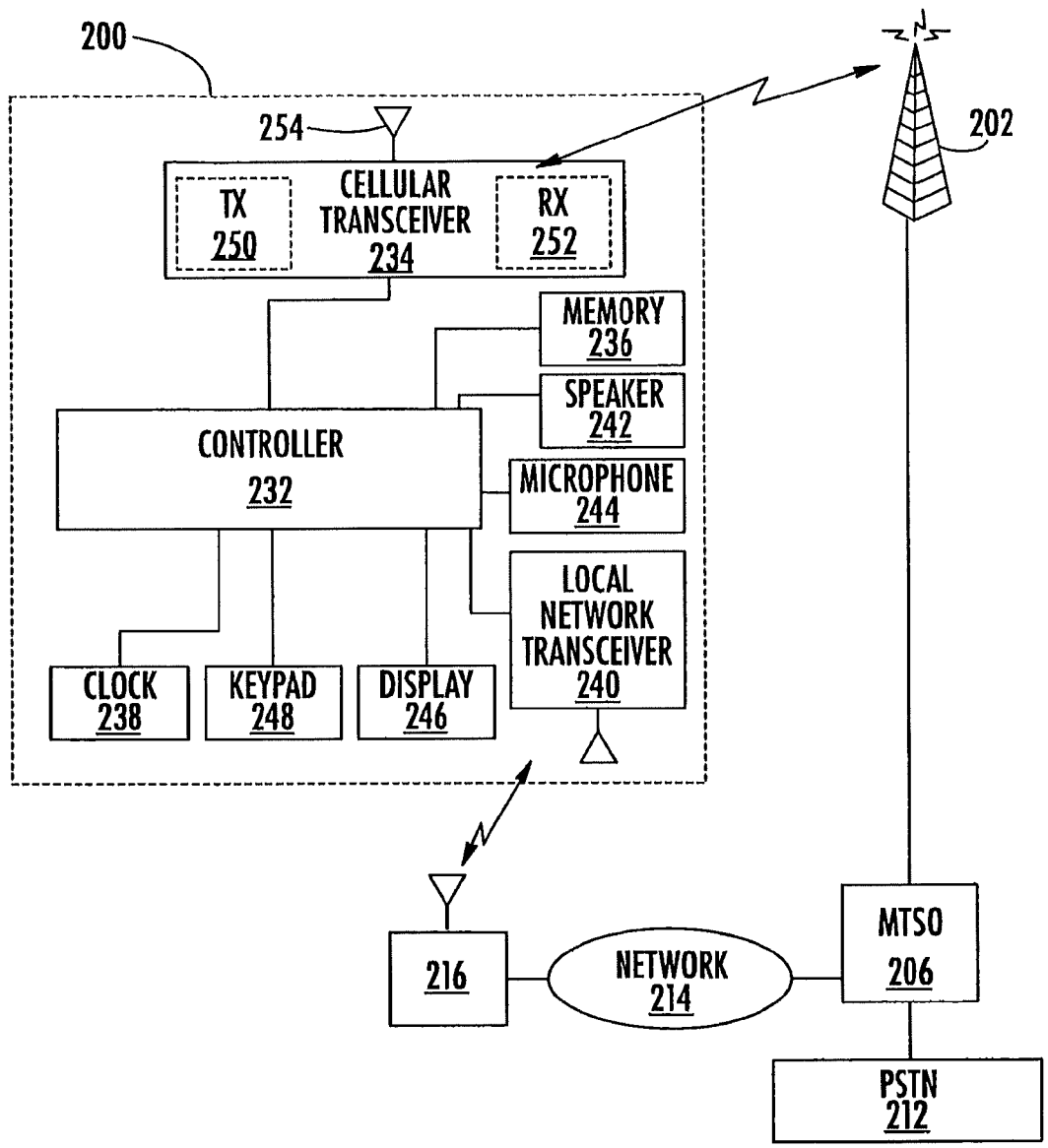
FIG. 10 is a schematic block diagram illustrating a wireless communication system with a wireless mobile communications device according to some embodiments of the invention.

FIG. 10 is a schematic block diagram of a wireless communication system that includes a wireless terminal 200, such as a mobile wireless communications terminal, that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11a, 802.11b, 802.11e, 802.11g, 802.11i, and/or other wireless local area network protocols. The wireless local network 216 may be connected to the network 214.

In some embodiments of the invention, the mobile terminal 200 includes a controller circuit 232, a cellular transceiver circuit 234, a memory circuit 236, a timing circuit (clock) 238, a local network transceiver circuit 240, a speaker device 242, a microphone device 244, a display device 246 and a keypad 248. The display 246 can incorporate the elements of the displays 12, 12' discussed herein.

The memory 236 stores software that is executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another.

In particular, the controller 232 may be configured to control operations as described with respect to FIGS. 1-9, for example, by identifying a user input from the electromagnetic radiation profile detected by the detectors D of the display 12, 12' and by determining a user's selection among items that are displayed on the display device 246 responsive to the identified input.

The cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 228 and 254 may be a single antenna.

Figure 11:
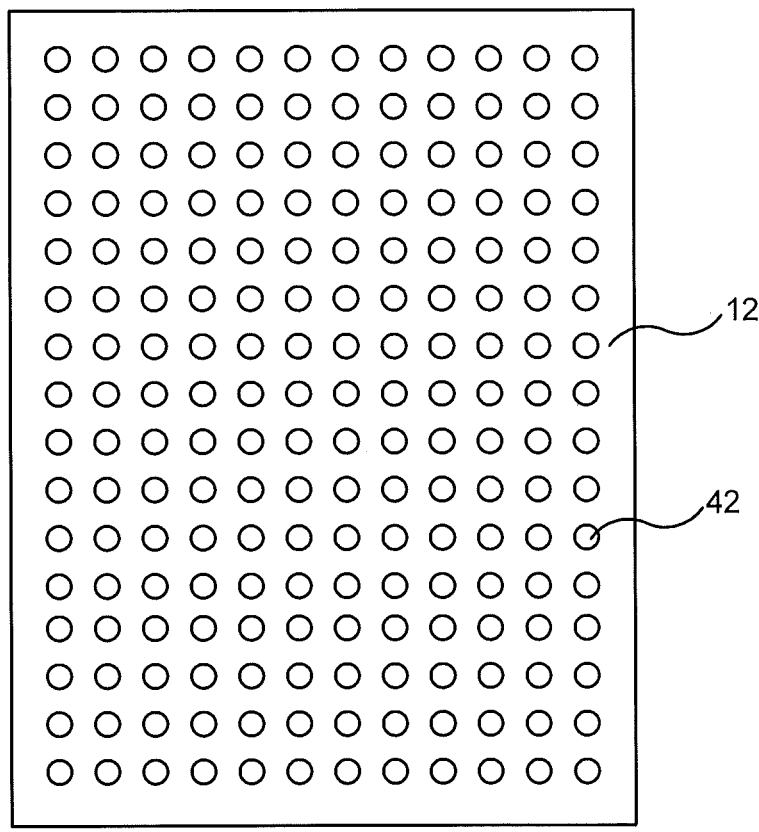
FIG. 11 is a plan view of a display according to further embodiments.
Figure 12:
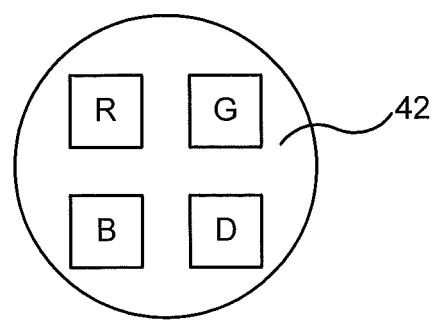
FIG. 12 is a schematic illustration of a pixel of a display according to further embodiments.

Further embodiments are illustrated in FIGS. 11 and 12. As shown therein, a display 12 may include a plurality of pixels 42, respective ones of which may include OLED and/or LED emitters R, G, B and an IR detector D. The outputs of the IR detectors D can be sampled to generate an image signal that represents a sensed image, such as the IR image illustrated in FIG. 5A, of space proximate to the display 12. As noted above, the IR image can be processed using conventional image processing techniques to identify the presence of a user input object, such as a user's finger and/or a stylus. According to some embodiments, motions and/or actions by the user input object can be interpreted by the controller 232 as corresponding to various types of inputs or commands. Because the array of detectors D can sense motion of the user input object before it touches the display 12, the mobile terminal 200 can respond to other types of actions, or combinations of actions, besides touches or tough-based gestures. According to some embodiments, non-touch based gestures combined with touch-based gestures can be used to control operations of the mobile terminal 200.

Figure 13:
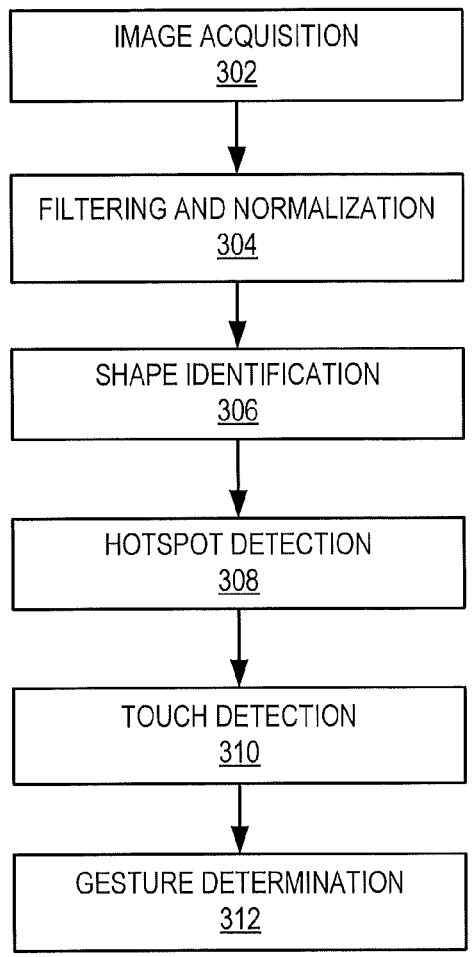
FIG. 13 is a flowchart illustrating operations according to embodiments of the current invention.

Gesture interpretation according to some embodiments may be more involved than gesture interpretation using a conventional touch-only touchpad. For example, FIG. 13 is a diagram illustrating gesture interpretation according to some embodiments. Blocks in the diagram of FIG. 13 may represent steps used in gesture interpretation by a mobile terminal 200 and may be implemented as functional modules in a software program executed by the controller 232 in the mobile terminal 200.

Referring to FIG. 13, gesture interpretation may include one or more of image acquisition (Block/module 302), image filtering and normalization (Block/module 304), shape identification (Block/module 306), hotspot detection (Block/module 308), touch detection (Block/module 310) and gesture determination (Block/module 312).

Image acquisition (Block/module 302) may be performed by sampling outputs of the IR detectors D and responsively generating an image signal that represents a two-dimensional electromagnetic image of the user input object (e.g., a finger or stylus). The generated image signal may be filtered and normalized (Block/module 304) to reduce noise, sharpen edges, highlight image features, or for other purposes. Shape identification (Block/module 306) uses pattern recognition to identify shapes represented in the image signal. In general, pattern recognition may involve feature extraction, in which numeric or symbolic information about an image is computed. A classification or description scheme classifies the extracted features. For example, features that can be extracted from the image represented by the image signal can include scale-invariant and/or rotation-invariant features of the image. Object/image recognition techniques are well known to those skilled in the art and need not be described in detail herein.

Once a shape of a user input object, such as a user's finger, a stylus tip, etc., has been identified in the image, the location of a "hotspot" of the user input object is identified (Block/module 308). "Hotspot" refers to a point on the user input object at which contact between the user input object and the display screen 12 is expected, if the user were to touch the display 12 with the user input object. That is, even though the user input object (e.g., finger, stylus, etc.) is not in contact with the display 12, the operation of the mobile terminal 200 can be controlled in response to a location of the hotspot, as discussed in more detail below.

Hotspot determination can be performed using one or more heuristic and/or deterministic techniques. For example, a hotspot can be predicted/located based on a determination that a particular identified user input object is a user's finger, a user's thumb, or a stylus or other artificial pointing device. Hotspot determination can also be performed based on calibration data. For example, a preliminary hotspot can be determined, and the user can then be asked to touch the screen. The location of the hotspot can then be adjusted based on a difference between the expected and actual locations of the touch on the screen.

Figure 14:
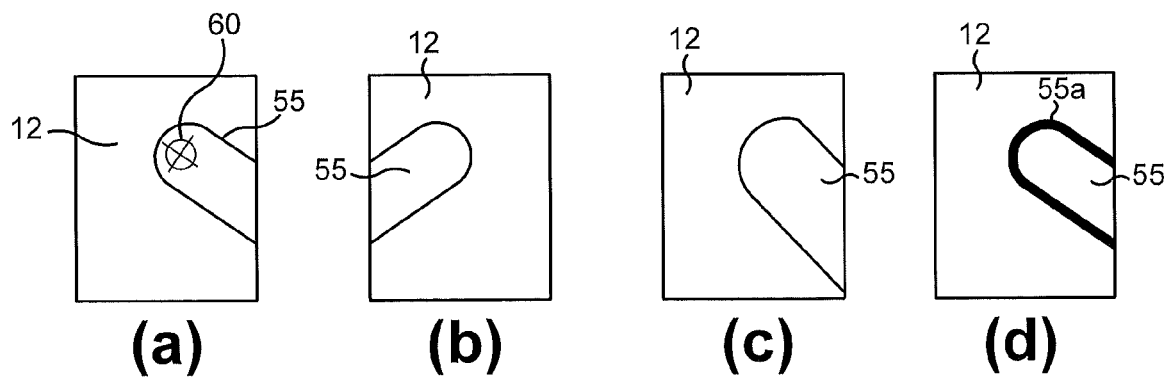
FIG. 14 illustrates digital images of user input objects according to various embodiments.

Shape determination is illustrated in more detail in FIG. 14. As shown therein, shape determination can be used to determine attributes of a user input object 55, such as shape (e.g., index finger, thumb or stylus), orientation (left or right hand), and distance to screen, as determined by edge blur. For example, as shown in FIG. 14(d), a user input object 55 that is held away from the screen can exhibit edge blurring 55a. The amount of edge blur can be interpreted as a measure of the distance of the user input object 55 from the display 12.

Figure 15:
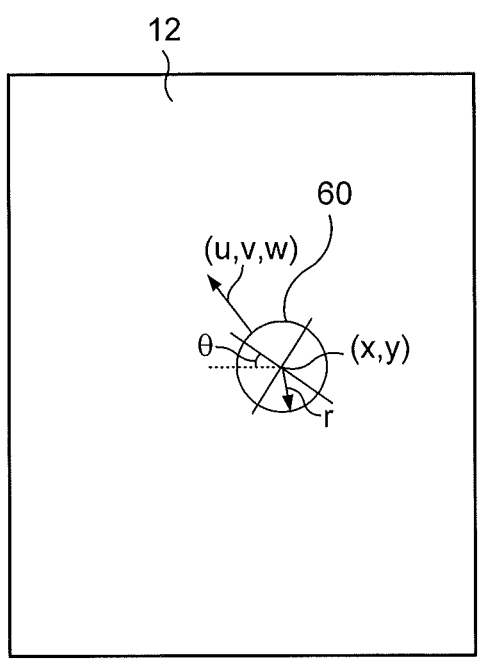
FIG. 15 illustrates some attributes of a hotspot that can be captured and characterized according to some embodiments.

Referring to FIG. 14(a), a hotspot 60 is determined based on the location and orientation of the user input object 55. A hotspot 60 is shown in more detail in FIG. 15.

According to some embodiments, a mobile terminal 200 may include a hotspot detection module 308 that analyzes an image captured by the detectors D of the display 12. The hotspot detection module can identify and output various attributes of the hotspot, such as the shape (s), position (x,y), angular orientation ($\theta$), radius (r), distance from display screen (z), and/or velocity vector (u,v,w). One or more gestures can be inferred in response to these attributes. In some embodiments, one or more gestures can be inferred in response to these attributes in combination with a touch on the touchscreen display 12.

The shape (s) refers to the type of shape detected as a user input object by the hotspot detection module 308, such as a finger, thumb, stylus, etc.

The position (x,y) represents the center of the hotspot 60. It may be determined based on knowledge of the type of shape that is used as a user input object. Once the shape has been identified, the hotspot detection module 308 can apply a heuristic or deterministic technique to locate the center of the hotspot 60 based on the type of shape. Furthermore, in some embodiments, different shapes can be used as user input objects to activate different functions in the mobile terminal 200. For example, a thumb shape can be used to activate different functionality than a finger shape in some embodiments. The hotspot center position defines the location on the display 12 that is activated by a particular gesture.

The hotspot center position (x,y) can be calibrated by instructing the user to touch a location on the display 12. The location may be any location on the display, or may be a predefined location, such as a location indicated by a graphic icon. The location of the touch is detected by the touchscreen function of the display 12, and the position of the hotspot center (x,y) relative to the shape (s) is determined.

The angular orientation ($\theta$) may represent the angle of a major axis of the user input object relative to the orientation of the display screen 12. Knowing the angular orientation ($\theta$) may permit more accurate hotspot determination. Furthermore, in some embodiments, different commands may be invoked based on the angular orientation of the user input object.

The size of the hotspot 60 is represented by the radius (r) of the hotspot 60. The radius represents the size of the portion of the user input object that is in contact with the display 12. For example, a finger may have a larger contact radius with the display screen 12 than a stylus. The radius of the hotspot 60 may be used to determine the activation area of effect of a gesture. In some embodiments, a probabilistic model that takes the size of the hotspot into account can be used to estimate or predict what area of the display screen 12 is being activated by the gesture.

The output (z) represents the distance of the user input object 55 to the display screen 12. By tracking a distance of the user input object to the display screen, gestures can be interpreted and used to invoke commands or actions in the mobile terminal 200 even if the user input object does not contact the display screen.

According to some embodiments, the distance (z) from the hotspot 60 to the screen 12 can be estimated by analyzing the relative blurriness of the edges of a tracked object. That is, the distance (z) may be estimated as a function of both the type/shape of object being tracked as well as the blurriness of the tracked object. Distance of the user input object from the display screen 12 can be used in some embodiments to invoke an image zoom function.

The velocity vector (u,v,w) of the hotspot tracks the velocity of the hotspot in the x- and y-directions (u and v) as well as the z-direction (w). The velocity (u,v,w) of the hotspot can be determined by calculating the distance covered from the last known hotspot coordinate. The velocity vector w in the z-direction can also take changes in the hotspot radius (r) into account when determining speed in the z-direction.

The display 12 also includes touchscreen capability, and the mobile terminal 200 is configured to determine when and where the screen 12 is touched by the user input object (Block/module 310). The display 12 may include a conventional touchscreen (e.g., resistive, capacitive, etc.) and/or may be configured as described above with respect to the embodiments of FIGS. 7 and 8 to detect a touch by a user input object.

Gesture determination can be based on one or more of the hotspot attributes output by the hotspot detection module 308. For example, the gestures shown in Table 1 below can be identified based on one or more hotspot attributes. As shown in Table 1, a gesture can be identified based on a pre-condition, a trigger, and a post condition. The combination of pre-condition, trigger, and post-condition signifies the occurrence of an event, which can be mapped to a feature or function in the mobile terminal 200. In Table 1, "HS" refers to "hotspot." The "Event" column represents data that are passed from the gesture detection to a higher layer (e.g. the application layer). Depending on the gesture in question, different data may be available to the applications. The number "1" in the Event column indicates that there is one event. The symbol "*" in the Event column indicates that there may be multiple events while the gesture is detected.

event), followed by detection of the hotspot again (the post-condition). The "click" gesture is interpreted in response to detection of a touch on the display with the velocity w in the z-direction exceeding a threshold velocity Wclick (the triggering event), followed by detection of the hotspot again (the post-condition). Although these gestures can be similar, these gestures can have different effects. For example, a "select" gesture can be used to slowly select a small portion of the display screen, such as a hyperlink displayed on a web page,

TABLE 1

Possible Gesture Detection Algorithms

| Gesture | Pre-condition | Trigger | Post-condition | Event | Possible Feature/Function |
|---|---|---|---|---|---|
| Select | HS detected | display touched | HS detected | Touch (x, y) w 1 Untouch (x, y) 1 | Select |
| Click | HS detected less than $t_{click}$ seconds ago | display touched and $w > w_{click}$ | HS detected | Touch (x, y) w 1 Untouch (x, y) 1 | Select |
| Drag | HS detected + display touched | HS moved | display touched | (x, y)-[u, v, w]* | Sort lists |
| Track | HS detected | HS moved | HS detected | (x, y)-[u, v, w]* | Highlight items to be selected |
| $2^{nd}$ Select | HS detected + display touched | $2^{nd}$ HS detected | HS detected + display touched | Touch2 (x, y) 1 | Option menu |
| Flick | HS detected + display touched | HS moved quickly | display not touched | (x, y)-(u, v) 1 | Scroll |
| Pinch | two HS detected + display touched | two HS separation distance changed | one/two HS detected + display touched | (x1, y1), (x2, y2)* | Zoom in/out |
| Grab | two HS detected + display not touched | display touched + two HS merge | display not touched | (x, y) | Cut/copy |
| Drop | one HS detected + display not touched | display touched + one HS becomes two | display not touched | (x, y) | Paste |
| Sleep | no HS detected + display not touched | Entire screen covered with hand | no HS detected | | Go to standby |
| Wave | no HS detected + display not touched | hand moved in front of screen from one side to another | no HS detected | (u, v) 1 | Next/previous page (vertical wave) Undo previous action (horizontal wave) |
| Answer | display not touched | ear shape detected | none | (x, y) 1 | Answer call |

As can be seen from Table 1, three dimensional user input object tracking and gesture interpretation is a superset of two dimensional gesture interpretation that is familiar to users of touch pads and touch screens. However, three dimensional user input object tracking and gesture interpretation enables a wider variety of gestures to be implemented, including intuitive gestures, such as drag and drop.

Combining user input object tracking with algorithms to detect different gestures enables the creation and implementation of a wide range of unique user interface actions. For example, Table 1 defines both a "select" gesture as well as a "click" gesture. The "select" gesture is interpreted in response to detection of a hotspot (the pre-condition), followed by detection of a touch on the display (the triggering while the "click" gesture can be used to select a large hit area, such as a clickable button on the touchscreen.

The "tracking" gesture can provide better usability, for example in highly dense web pages wherein the actual link can be highlighted as with a mouse pointer, to give the user visual feedback of what portion of the display screen will be selected with a "select" gesture.

It will be appreciated that gestures can be different depending on the particular user input object used and/or the same gesture can activate different functions within the mobile terminal 200 depending on which user input object is used (e.g. finger versus thumb). Accordingly, it will be appreciated that in some embodiments, shapes can be used to trigger different events. Furthermore, shapes can be used to increase accuracy of the selection of intended targets.

In accordance with some other embodiments, an electronic device includes a touch sensitive display and a controller circuit that is configured to detect the size and/or angular orientation of a user touch object relative to the display, and to use that information to assist with determining which characters that are visually displayed on a keyboard are being selected by the user and/or to modify how the keyboard and associated characters are displayed to the user. These and further embodiments are described in detail below with regard to FIGS. 16-26. Although various embodiments are described herein in the context of the mobile terminal 200 of FIG. 10, the invention is not limited thereto, as it may be embodied in any electronic device that includes a touch sensitive display screen and a controller circuit.

As used herein, the term "selected" refers to the image signal indicating that a finger or other user input object is closely located to, but not necessarily touching, a display, such as the touch sensitive display 246. Accordingly, a user input object may be determined to have selected a displayed key when it is adjacent to but not touching the key. Thus, in accordance with some embodiments, a user input object may be placed close to but not necessarily touching the display to trigger the operation of various functionality described here, such as selecting characters on a displayed keyboard and/or causing different keyboard configurations to be displayed. Alternatively, in some other embodiments, such functionality may not be triggered until the user input object physically contacts one or more defined regions of the display.

In some embodiments, as described above, the display device 246 includes an array of electromagnetic radiation detectors D that are configured to generate an image signal that represents an image of a user input object that is closely spaced to the display. The user input object may include, but is not limited to, fingers on the user's hand and/or a stylus or other object manipulated by the user. The detectors D may be further configured to generate a touch signal in response to the display 246 being touched by the user input object.

Figure 16:
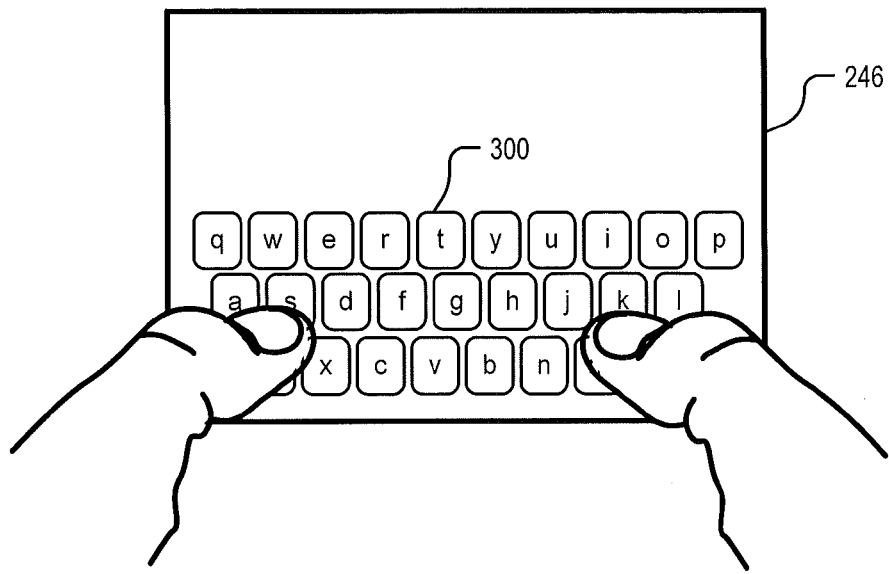
FIG. 16 illustrates an exemplary QWERTY keyboard that the controller circuit may draw on the display device according to some embodiments.

The controller circuit 232 is configured to visually display on the display device 246 a plurality of keys in an arrangement that forms a keyboard and to display characters on the keys. As used herein, the term "keyboard" includes, but is not limited to, a full or partial QWERTY keyboard layout, a touchpad layout (e.g., conventional telephone keypad arrangement with alphabetic and numeric symbols), or any other key layout. FIG. 16 illustrates an exemplary QWERTY keyboard that the controller circuit 232 may draw on the display device 246. Referring to FIG. 16, the QWERTY keyboard includes graphic symbols that represent keys 300 and characters that are displayed within the keys 300.

The controller 232 may be configured to identify from the image signal a size and/or an angular orientation of a closely spaced user input object relative to the display device 246. The controller 232 can identify a user's selection among the characters indicated on the keyboard keys 300 in response to the identified size and/or angular orientation of the user input object and in response to the touch signal, and output character data corresponding to the identified user selected character to other circuitry/functional applications in the mobile terminal 200.

For example, when a touch point appears to be between two adjacent keys 300, the controller 232 may identify a first one of the two keys that occurs in a direction indicated by the identified angular orientation of the user input object as being the user selected key. Thus, when a finger from the left hand touches the keyboard between two horizontally adjacent keys, the controller 232 can respond thereto by determining that the left key was selected. Similarly, when a finger from the right hand touches the keyboard between the two horizontally adjacent keys, the controller 232 can respond thereto by determining that the right key was selected.

Alternatively or additionally, the controller 232 may identify a user's selection among a plurality of characters that are displayed on a select key in response to the size of the user's finger. For example, the controller 232 may distinguish between key selections that are made by the user's thumb from selections made by the user's other non-thumb fingers (e.g., index finger). Accordingly, the angular orientation and/or the size of the user's finger can be used to identify which key on a keyboard was selected and/or to identify which character was selected among a plurality of characters that are displayed on a selected key. These and other embodiments are described in further detail below.

The controller 232 may be configured to display a plurality of different characters on some or all of the keyboard keys 300, and to identify a user's selection among the characters displayed on a selected one of the multi-character keys 300 in response to the identified angular orientation of the user input object that is selecting the key.

Figure 17:
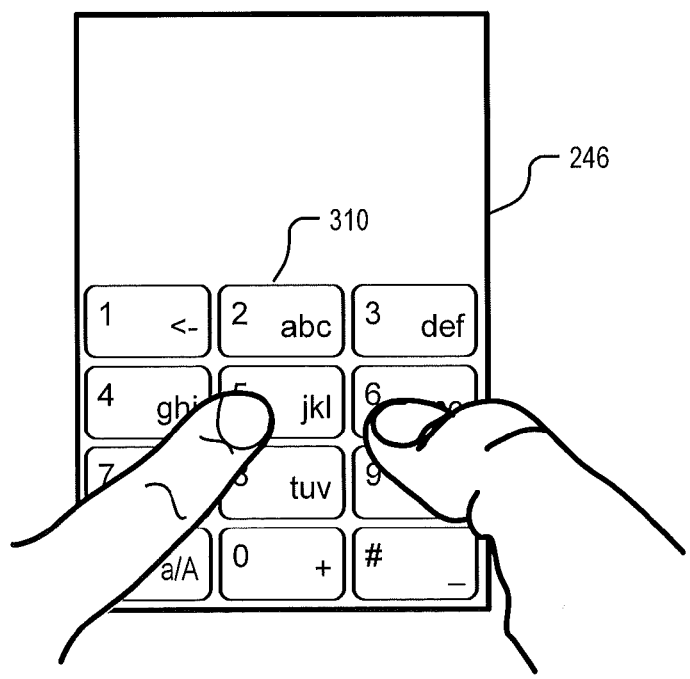
FIG. 17 illustrates another exemplary keyboard that the controller circuit may draw on the display device according to some embodiments.

FIG. 17 illustrates an exemplary keyboard (e.g., keypad) that the controller 232 may draw on the display device 246. Referring to FIG. 16, the keyboard includes a plurality of characters that are displayed on each key 310. The illustrated characters include alphabetic characters and non-alphabetic characters (e.g., numbers, mathematical and other symbols). The controller circuit 232 can be configured to identify a user's selection among the multiple characters displayed on a selected one of the multi-character keys 310 in response to the identified angular orientation of the user input object that is selecting the key.

Figure 18:
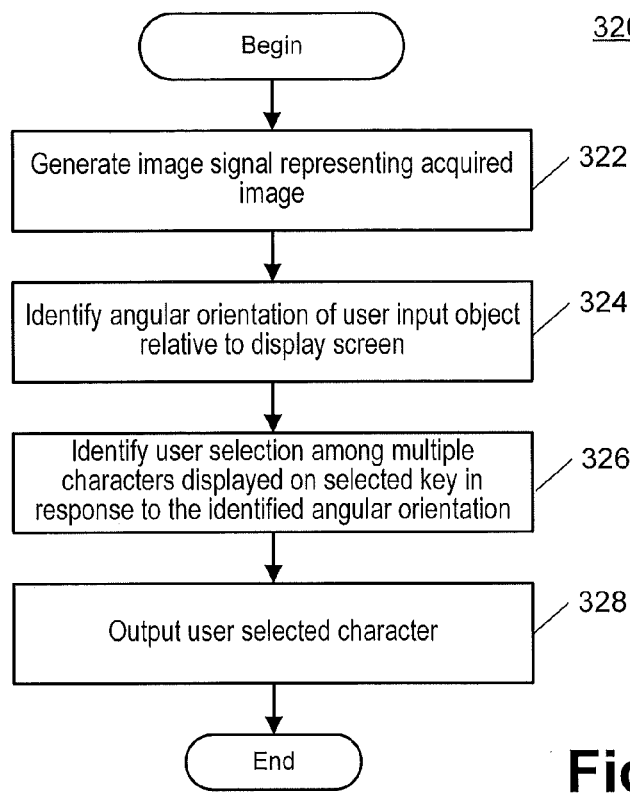
FIG. 18 is a flowchart of operations that may be carried out by the controller to identify a user's selection among multiple characters that are displayed on keyboard keys according to some embodiments.

FIG. 18 is a flowchart of operations 320 that may be carried out by the controller 232 to identify a user's selection among multiple characters that are displayed on keyboard keys, such as on the keyboard 310 of FIG. 17. Referring to FIGS. 17 and 18, the display 246 can generate (block 322) an image signal representing an acquired image of a user input object before and/or after it contacts the display 246. The controller 232 identifies (block 324) an angular orientation of the user input object indicated by the image signal relative to the display 246. The controller 232 then identifies (block 326) a user selection among the multiple characters displayed on a selected key 310 in response to the identified angular orientation, and outputs the user selected character (block 328).

For example, one of the keys 310 shown in FIG. 17 includes the alphabetic characters "a", "b", and "c". The controller 232 can be configured to identify the leftmost character ("a") as having been selected by the user when the user's finger approaches the selected key from the left, can identify the rightmost character ("c") as having been selected by the user when the user's finger approaches the selected key from the right, and can identify the center character ("b") as having been selected by the user when the user's finger approaches the selected key from the top/bottom of the keyboard keys 310.

Figure 19:
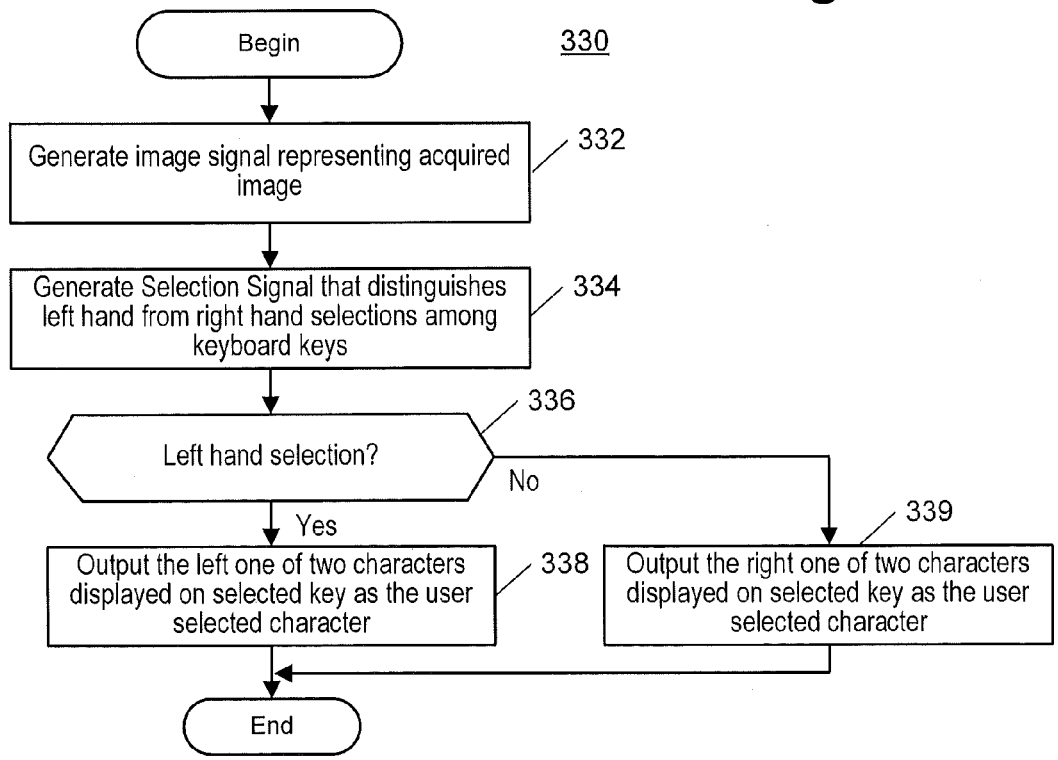
FIG. 19 is a flowchart of operations that may be carried out by the controller to identify a user's selection among two characters that are displayed on a selected keyboard key according to some embodiments.

FIG. 19 is a flowchart of further operations 330 that may be carried out by the controller 232 to identify a user's selection among two characters that are displayed on keyboard keys, such as on the keyboard 310 of FIG. 17. The operations 330 of FIG. 19 primarily differ from the operations 320 of FIG. 18 in that the controller 232 can identify whether the user has selected a key using a finger on the left hand or on the right-hand in response to the identified angular orientation, and can select among two characters on the selected key in response thereto.

Referring to FIG. 19, the display 246 generates (block 332) an image signal representing an acquired image of a finger relative to a selected key. The controller 232 generates (block 334) a selection signal that distinguishes a key selection that has been made by a finger on the left hand from a key selection that has been made by a finger on the right-hand. The controller 232 determines (block 336) whether a finger on the user's left-hand selected the key and, if so, it outputs (block 338) the left one of the two characters displayed on the selected key as the user selected character. In contrast, if a finger on the user's right-hand selected the key then the controller 232 outputs the right character displayed on the selected key as the user selected character.

Some further embodiments are directed to activating and deactivating predictive text entry operation in response to the angular orientation of the user input object relative to the display. The predictive text entry operation selects a candidate word among a database of defined words using a sequence of alphabetic characters entered as a user types on a keyboard that is displayed on a touch sensitive display.

Figure 20:
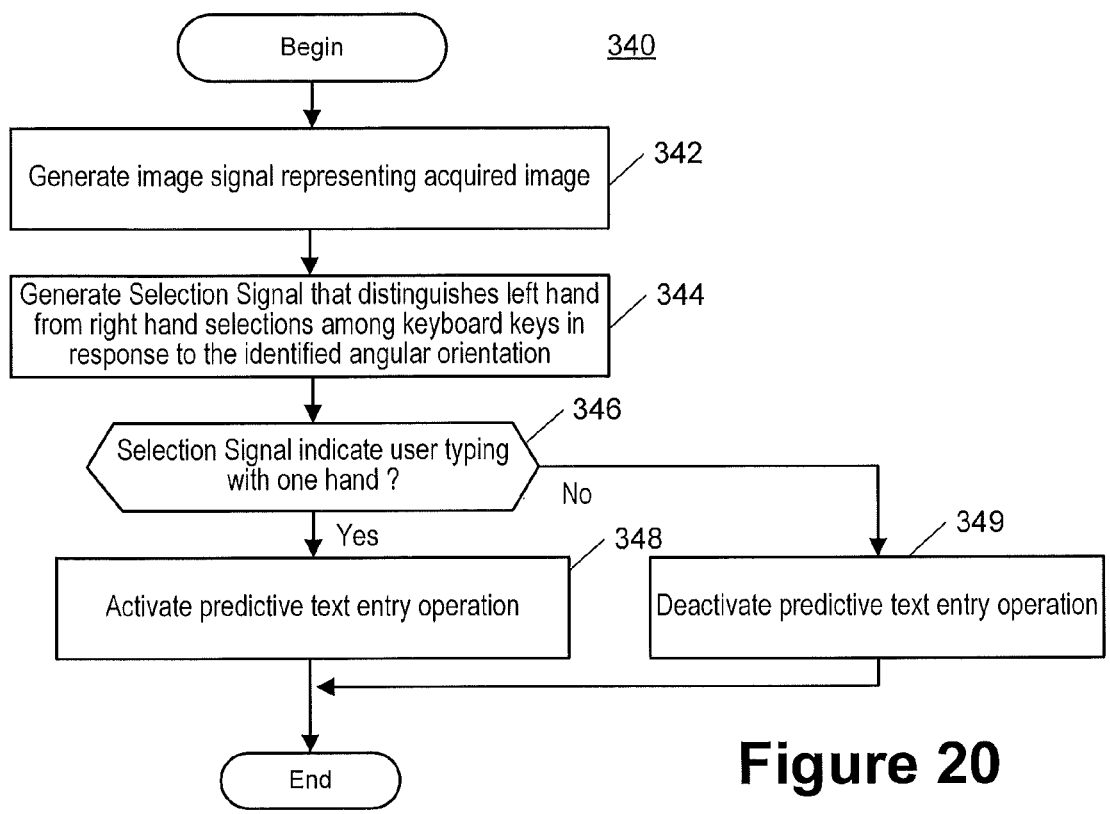
FIG. 20 is a flowchart of operations to may be carried out by the controller to activate and deactivate predictive text entry operation according to some embodiments.

FIG. 20 is a flowchart of operations 340 that may be carried out by the controller 232 to activate and deactivate predictive text entry. Referring to FIG. 20, the display 246 generates (block 342) an image signal representing an acquired image of a finger relative to a selected key. The controller 232 generates (block 344) a selection signal that distinguishes between selection among the keyboard keys by a finger on the user's left-hand from selection by a finger on the user's right-hand in response to identified angular orientation of the user input object. The controller 232 determines (block 346) from the selection signal whether the user is typing with one hand and, if so, it activates (block 348) a predictive text entry operation that selects the candidate word among a database to find words using a sequence of user selected keyboard characters as the user types on the keyboard using one hand. Alternatively, the controller 232 response to a determination (block 346) that the user is typing on the keyboard using both hands by deactivating (block 349) the predictive text entry operation.

Figure 21:
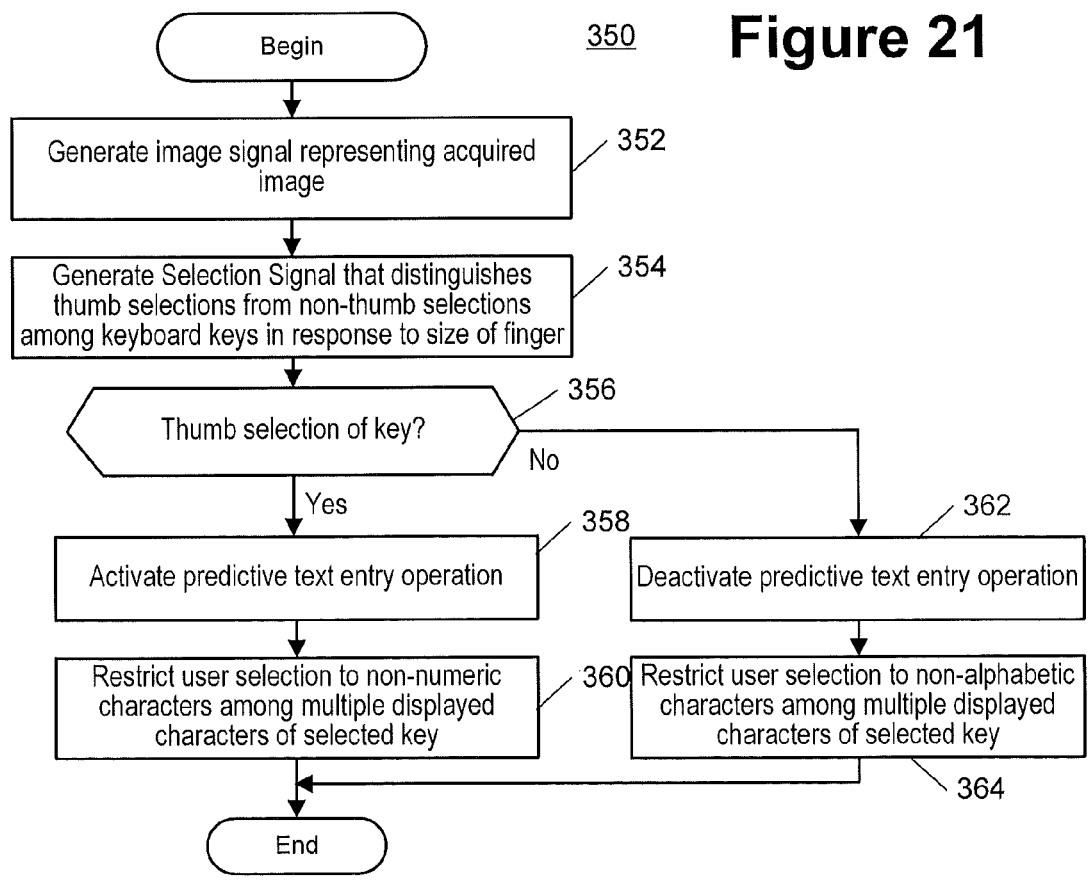
FIG. 21 is a flowchart of operations to may be carried out by the controller to activate and deactivate predictive text entry operation and determine a user selection among numeric, alphabetic, and/or other characters that are displayed on a selected key in response to a size of the user's finger that selected the key according to some embodiments.

Some further embodiments are directed to activating and deactivating predictive text entry operation and determining a user selection among numeric, alphabetic, and/or other characters that are displayed on a selected key in response to a size of the user's finger that selected the key. FIG. 21 is a flowchart of operations 350 to may be carried out by the controller 232 to perform at least some of this functionality. Referring to FIG. 21, the display 246 generates (block 352) an image signal representing an acquired image of a finger relative to a selected key. The controller 232 generates (block 354) a selection signal that distinguishes between the user using a thumb to select a key and using a non-thumb finger to select the key in response to the size of the selecting finger. The controller 232 determines (block 356) from the selection signal whether the user selected the key with a thumb and, if so, it activates (block 358) a predictive text entry operation and restricts (block 360) the user's possible character selections to non-numeric characters among multiple display characters of the selected key. Alternatively, the controller 232 responds to a determination (block 356) that the user selected the key using a non-thumb finger by de-activating (block 362) a predictive text entry operation (if it was active) and restricting (block 364) the user's possible character selections to numeric characters among multiple display characters of the selected key.

By way of a particular non-limiting example, referring to the keyboard keys 310 shown in FIG. 17, the controller 232 can respond to a user selecting a key using a non-thumb finger (e.g., index finger) by deactivating predictive text entry and restricting the user's possible character selections to the displayed non-alphabetic characters (e.g., numbers and mathematic symbols) on the selected key. In contrast, the controller 232 can respond to a user selecting a key using a thumb by activating predictive text entry and restricting the user's possible character selections to the displayed alphabetic characters on the selected key.

Figure 22:
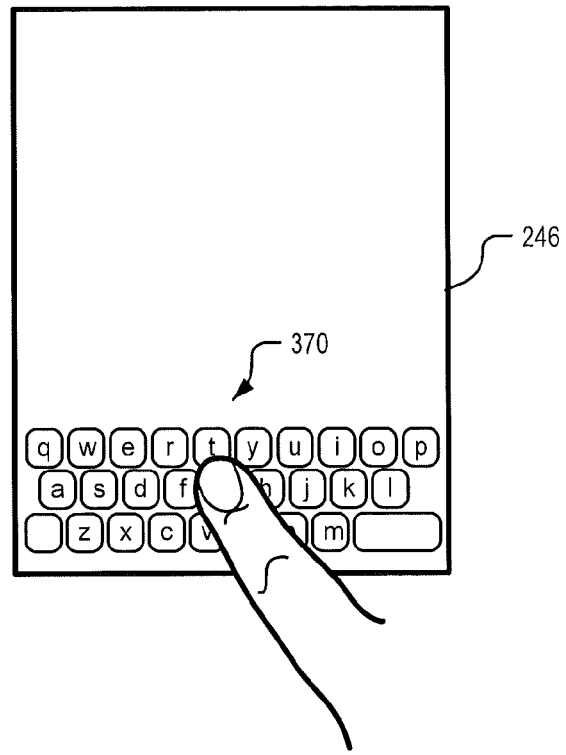
FIG. 22 illustrates an exemplary QWERTY keyboard that the controller may display on the display device with one character per key according to some embodiments.
Figure 23:
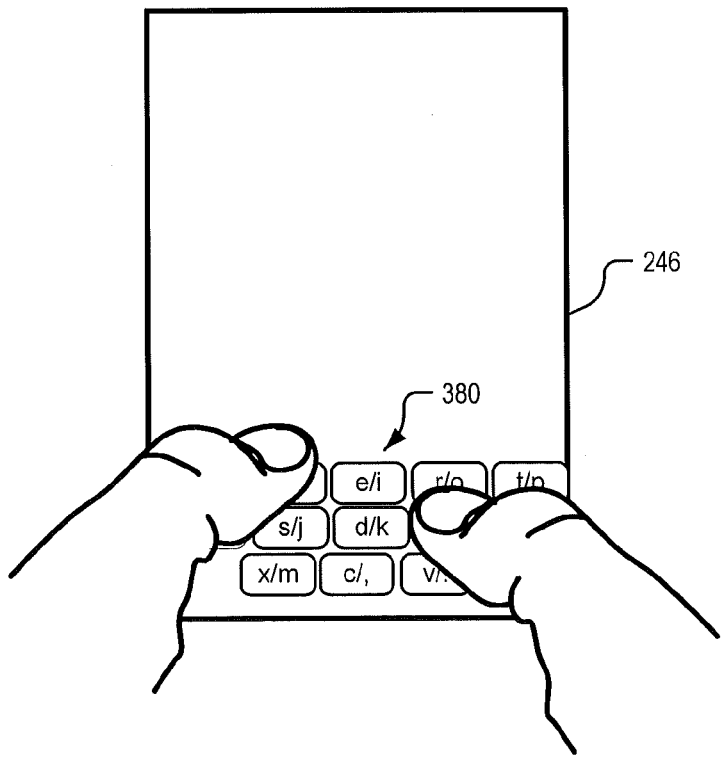
FIG. 23 illustrates a more compact QWERTY keyboard that the controller may display on the display device with two characters per key according to some embodiments.
Figure 24:
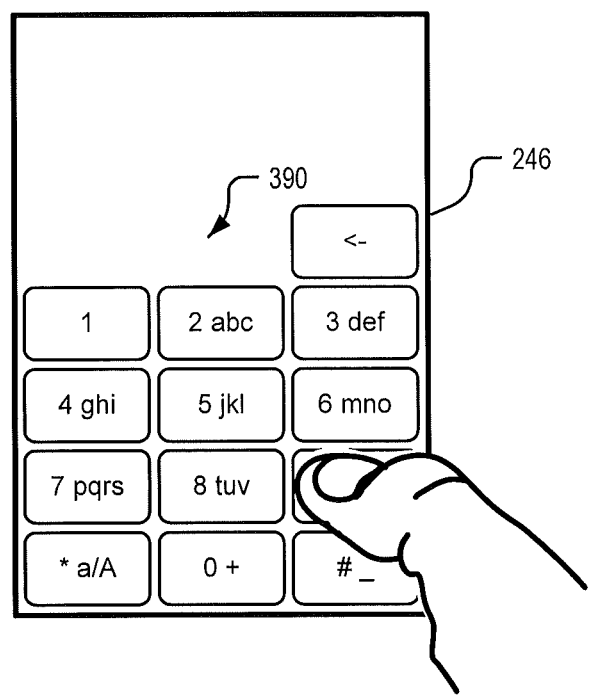
FIG. 24 illustrates an still more compact keyboard that the controller may display on the display device with two characters per key according to some embodiments.

Some further embodiments are directed to controlling the number and/or size of keyboard keys and/or the number of characters are displayed on each key in response to a size of the user's finger and number of fingers that the user uses to select keyboard keys. Exemplary embodiments are described below with regard to FIGS. 22-26. FIG. 22 illustrates an exemplary QWERTY keyboard 370 that the controller 232 may display on the display device 246 with one character per key in response to a user using a non-thumb finger (e.g. index finger) to type on the keyboard. FIG. 23 illustrates a more compact QWERTY keyboard 380 that the controller 232 may display on the display device 246 with two characters per key in response to a user using two thumbs to type on the keyboard 380. FIG. 24 illustrates an even more compact keyboard 390 (e.g., a telephone keypad configuration) that the controller 232 may display on the display device 246 with two characters per key in response to a user using two thumbs to type on the keyboard 380.

Figure 25:
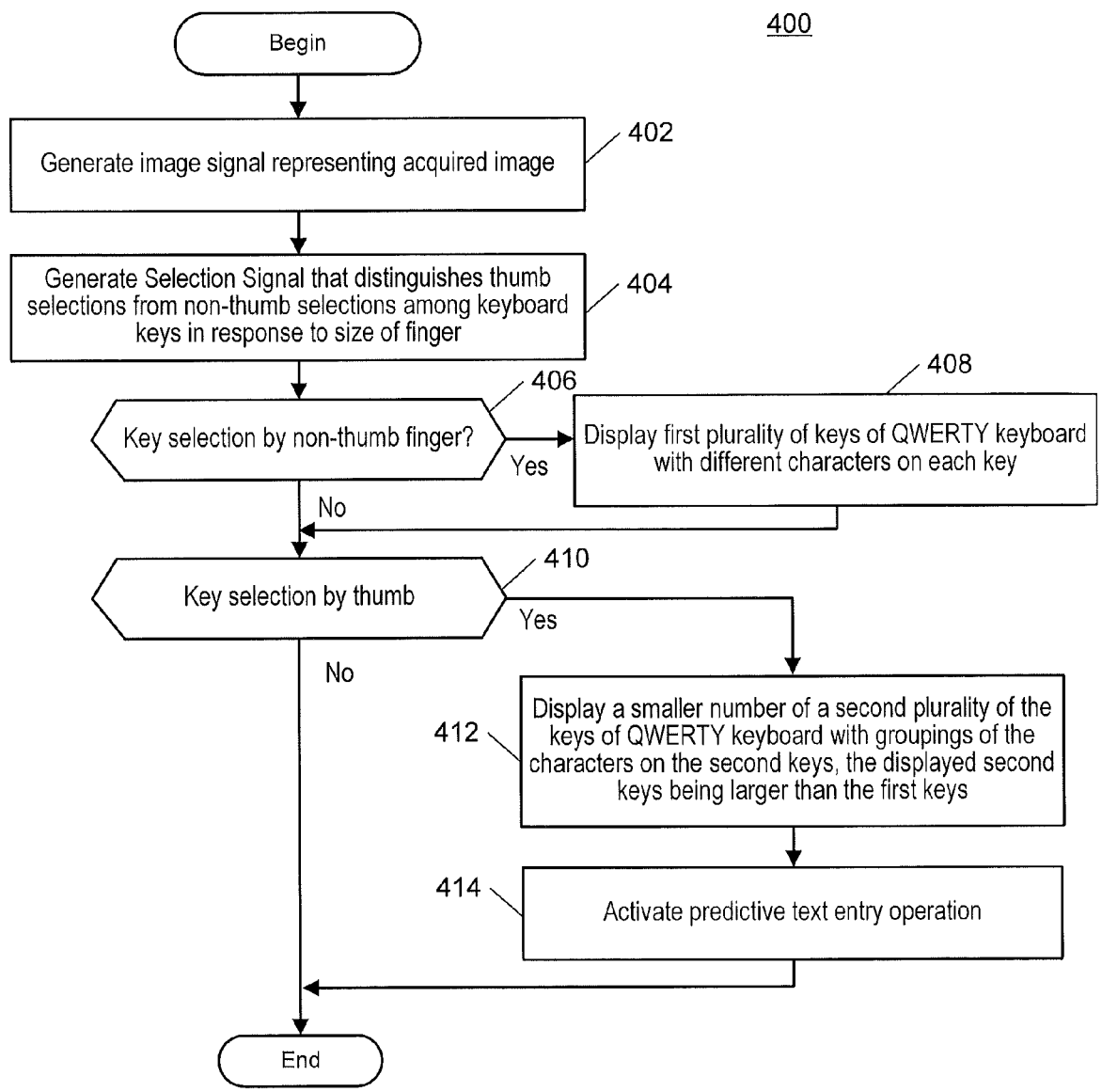
FIG. 25 is a flowchart of exemplary operations that may be carried out by the controller to perform at least some functionality to control the number and size of keyboard keys and the number of characters are displayed on each key in response to whether the user has selected a key with a non-thumb finger or a thumb according to some embodiments.

FIG. 25 is a flowchart of exemplary operations 400 that may be carried out by the controller 232 to perform at least some functionality to control the number and size of keyboard keys and the number of characters are displayed on each key in response to whether the user has selected a key with a non-thumb finger or a thumb. Referring to FIG. 25 in combination with exemplary keyboard to FIGS. 22-23, the display 246 generates (block 402) an image signal representing an acquired image of a finger relative to a selected key. The controller 232 generates (block 404) a selection signal that distinguishes between the user using a thumb to select a key and using a non-thumb finger to select the key in response to the size of the selecting finger. The controller 232 determines (block 406) from the selection signal whether the user selected the key with a non-thumb finger (e.g. index finger) and, if so, it displays (block 408) a first plurality of QWERTY keyboard keys 370 with a different character on each key. When the controller 232 determines (block 410) that the user selected a key using a thumb, it displays (block 412) a more compact QWERTY keyboard 380 having a smaller number of keys but which are larger than the keys of keyboard 370. The larger keys of the keyboard 380 may be more accurately selected by a user who is using one or both thumbs to type on the keyboard 380. The controller 232 may further activate predictive text entry operation (block 414) in response to the determination that the user is using a thumb to type on the keyboard 380.

Accordingly, the controller 232 may display different keyboards to a user in response to whether the user is typing with thumbs or non-thumb fingers, where the different keyboards may be particularly configured to facilitate easier more accurate typing by the user using the associated thumbs/non-thumb fingers.

Figure 26:
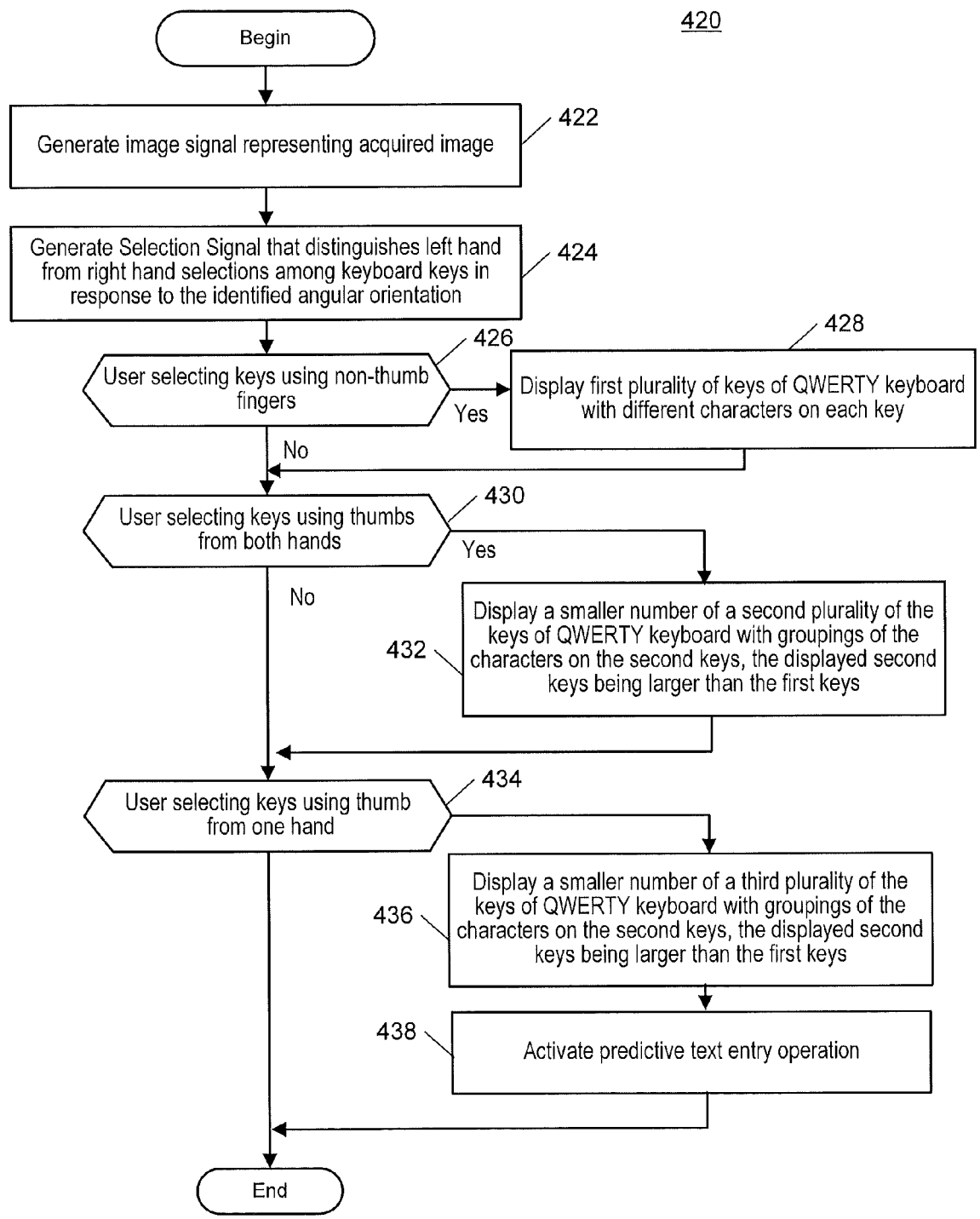
FIG. 26 is a flowchart of exemplary operations that may be carried out by the controller to perform at least some functionality to control the number and size of keyboard keys and the number of characters are displayed on each key in response to whether the user is typing with thumb/non-thumb fingers and whether the user is typing using both hands according to some embodiments.

FIG. 26 is a flowchart of exemplary operations 420 that may be carried out by the controller 232 to perform at least some functionality to control the number and size of keyboard keys and the number of characters are displayed on each key in response to whether the user is typing with thumb/non-thumb fingers and whether the user is typing using both hands. Referring to FIG. 26 in combination with exemplary keyboard to FIGS. 22-24, the display 246 generates (block 422) an image signal representing an acquired image of a finger relative to a selected key. The controller 232 generates (block 424) a selection signal that distinguishes between the user typing with fingers on the left-hand from typing with fingers on the right hand in response to the identified angular orientation of the fingers relative to the display 246. The controller 232 determines (block 426) from the selection signal whether the user is typing using non-thumb fingers (e.g., detects a defined length sequence of non-thumb key selections) and, if so, it displays (block 428) a first plurality of QWERTY keyboard keys 370 with a different character on each key. When the controller 232 determines (block 430) that the user is typing using comes from both hands, it displays (block 432) a more compact QWERTY keyboard 380 having a smaller number of keys but which are larger than the keys of keyboard 370. The larger keys of the keyboard 380 may be more accurately selected by the user typing with both thumbs. Although not shown, the controller 232 may further activate predictive text entry operation to predict words as the user types with both thumbs on the keyboard 380. When the controller 232 determines (block 434) that the user is typing using only one hand (e.g., one thumb on one hand), it displays (block 436) a yet more compact keyboard 380 having a smaller number of keys but which are larger than the keys of keyboard 370. The larger keys of the more compact keyboard 380 maybe more easily and accurately selected by the user typing with one thumb. The controller 232 activates (block 438) predictive text entry operation to predict words as the user types on the keyboard 390 using one hand.

Figure 27:
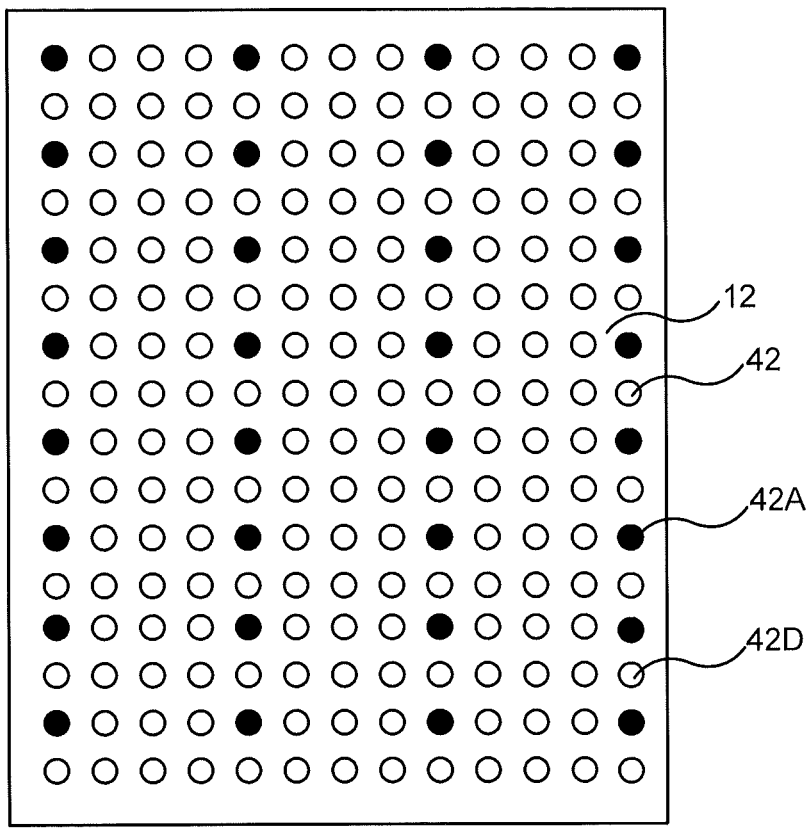
FIG. 27 is a plan view of a display according to further embodiments.
Figure 28:
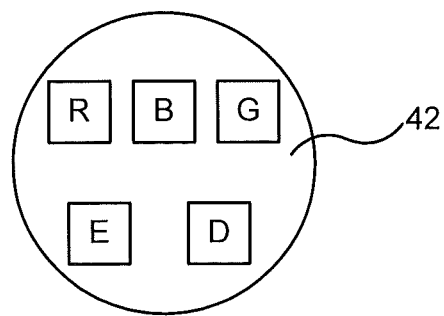
FIG. 28 is a schematic illustration of a pixel of the display of FIG. 27.

Further embodiments are illustrated in FIGS. 27 and 28. As shown therein, a display 12 may include a plurality of pixels 42, respective ones of which may include OLED and/or LED emitters R, G, B and an infrared (IR) emitter E and an infrared (IR) detector D. The IR emitters E emit infrared radiation in a direction away from the display 12. When a user input device, such as a stylus or finger, is positioned near the display, the infrared radiation emitted by the IR emitters E are reflected back to the display 12 and detected by the IR detectors D. The outputs of the IR detectors D may be sampled to generate an image signal that represents a sensed image, such as the IR image illustrated in FIG. 5A, of space proximate to the display 12. As noted above, the IR image can be processed using conventional image processing techniques to identify the presence of a user input object, such as a user's finger and/or a stylus. According to some embodiments, motions and/or actions by the user input object can be interpreted by the controller 232 as corresponding to various types of inputs or commands. Because the array of detectors D can sense motion of the user input object before it touches the display 12, the mobile terminal 200 can respond to other types of actions, or combinations of actions, besides touches or tough-based gestures. According to some embodiments, non-touch based gestures combined with touch-based gestures can be used to control operations of the mobile terminal 200.

As shown in FIG. 27, the IR emitters E of the pixels 42 may be active, as indicated by the darkened pixels 42A, or deactivated, as indicated by the open pixels 42D. The deactivation of the emitters in pixels 42D may reduce energy consumption by the display 12. As illustrated, the activated emitters of the pixels 42A may be spaced apart so that a user input object may be detected by the detectors of the pixels 42A when the user input object is positioned adjacent the display 12.

Figure 29:
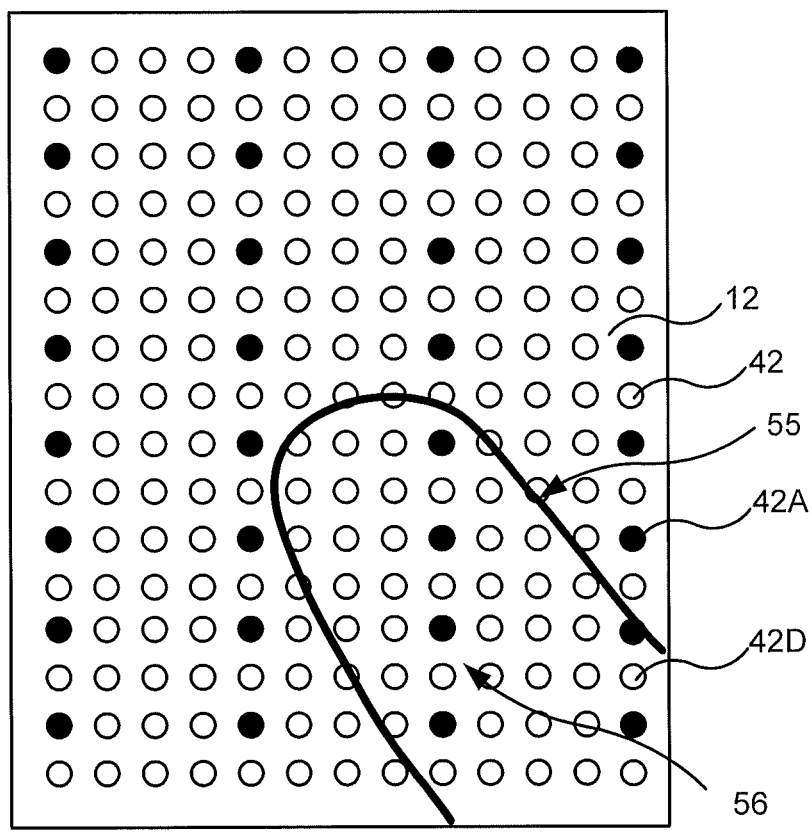
FIG. 29 is a plan view of the display of FIG. 27 with a user input object some of the emitters of the pixels activated according to some embodiments.
Figure 30:
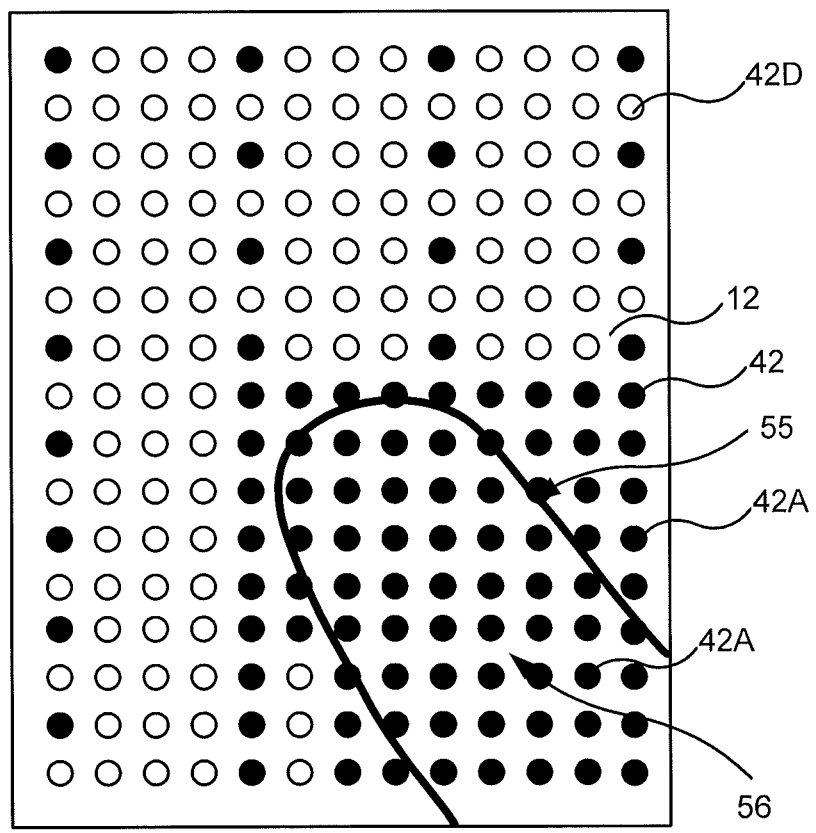
FIG. 30 is a plan view of the display of FIG. 27 some of the emitters of the pixels activated according to some embodiments.
Figure 31:
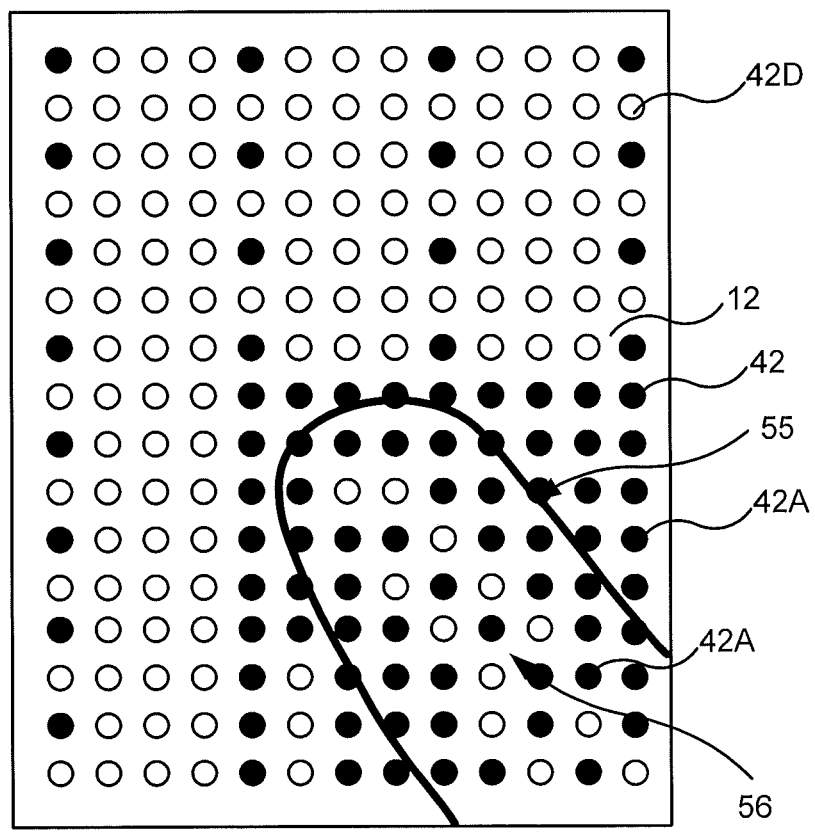
FIG. 31 is a plan view of the display of FIG. 27 with some of the emitters adjacent a perimeter of the user input object activated according to some embodiments.

For example, as illustrated in FIG. 29, a user input object 56 having an image perimeter 55 is positioned adjacent the display 12. When the detectors of the pixels 42 detect electromagnetic radiation, such as infrared radiation that is reflected from the user input object 56, the controller 232 activates additional pixels 42 in a region adjacent the object 52 as shown in FIG. 30. In this configuration, the display 12 may conserve power or energy consumption in the absence of a user input object, such as shown in FIG. 27. However, when a user input object 56 is detected as shown in FIG. 29, additional detectors D of the pixels 42A in the region adjacent the object 56 may be activated to provide improved detection of the electromagnetic radiation reflected from the object 56 as shown in FIG. 30. Although substantially all of the pixels 42A adjacent the object 56 are activated in FIG. 30, it should be understood that the pixels 42 may be selectively activated in any suitable pattern. For example, as shown in FIG. 31, the pixels 42A that are adjacent the periphery 55 of the object 56 are activated, and pixels 42D in the interior of the object 56 are deactivated. Thus, the display 12 may provide decreased power or energy consumption by deactivating the emitters in some of the pixels 42D, but activate the emitters of the pixels 42A in the presence of the user input object 56 as shown in FIGS. 30-31. Accordingly, more relevant portions of the user input object 56, such as the perimeter 55, may be used to determine which areas of the display 12 include a higher concentration of activated pixels 42A.

Figure 32:
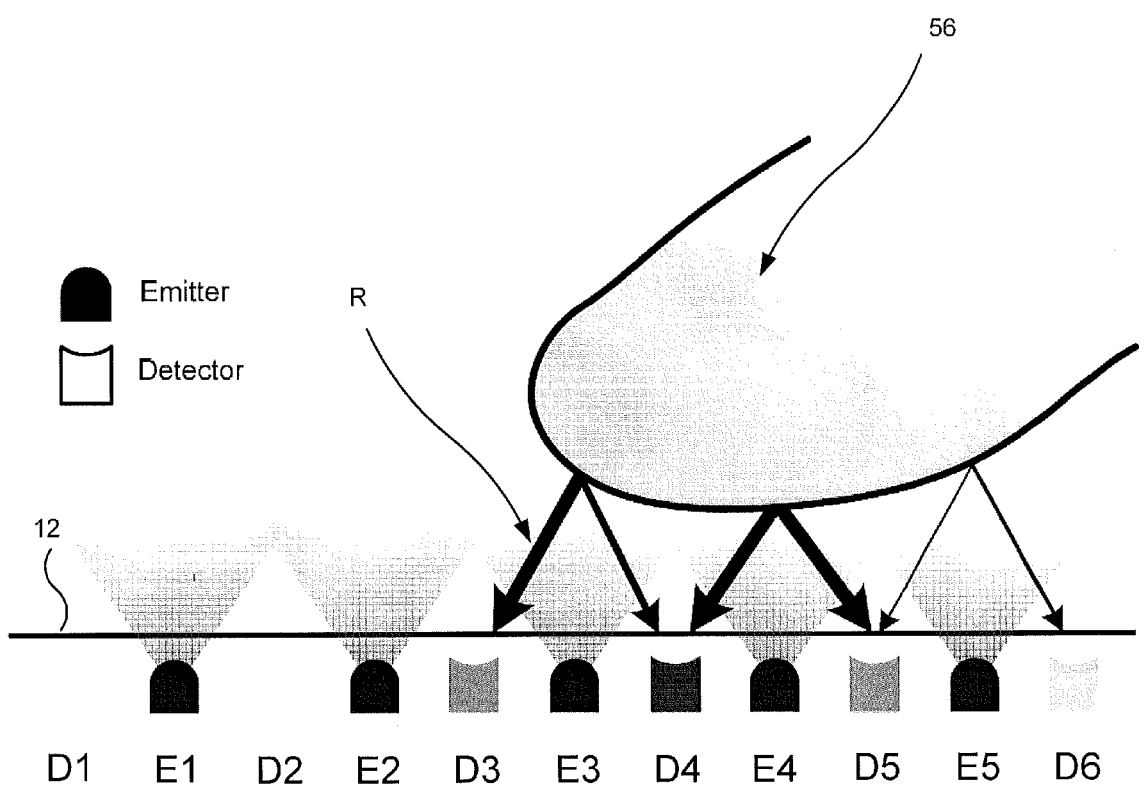
FIG. 32 is a schematic side view of an array of electromagnetic radiation emitters and detectors with all of the emitters activated according to some embodiments.

In some embodiments, the controller 232 is configured to activate different sets of emitters in the pixels 42 on the display 12 to identify a height or contour profile of the user input object 56 in response to the different electromagnetic radiation profiles that are detected as a result of the various sets of active emitters 42. For example, as illustrated in FIG. 32, all of the emitters E1-E5 of the display 12 are activated. The detectors D1-D6 generate a signal responsive to a detected amount of reflected electromagnetic radiation R. The radiation R varies responsive to an amount of radiation emitted by the emitters E1-E5, the distance between the user input object 56 and the display 12, and the angle of the surface of the user input object 56 with respect to the display 12. For example, as illustrated in FIG. 32, the detector D4 generally detects more electromagnetic radiation R than detectors D3 and D5. However, detectors D3 and D3 detect more electromagnetic radiation R than the detector D6. The detectors D1 and D2 generally do not detect electromagnetic radiation from the user input object 56.

Figure 33:
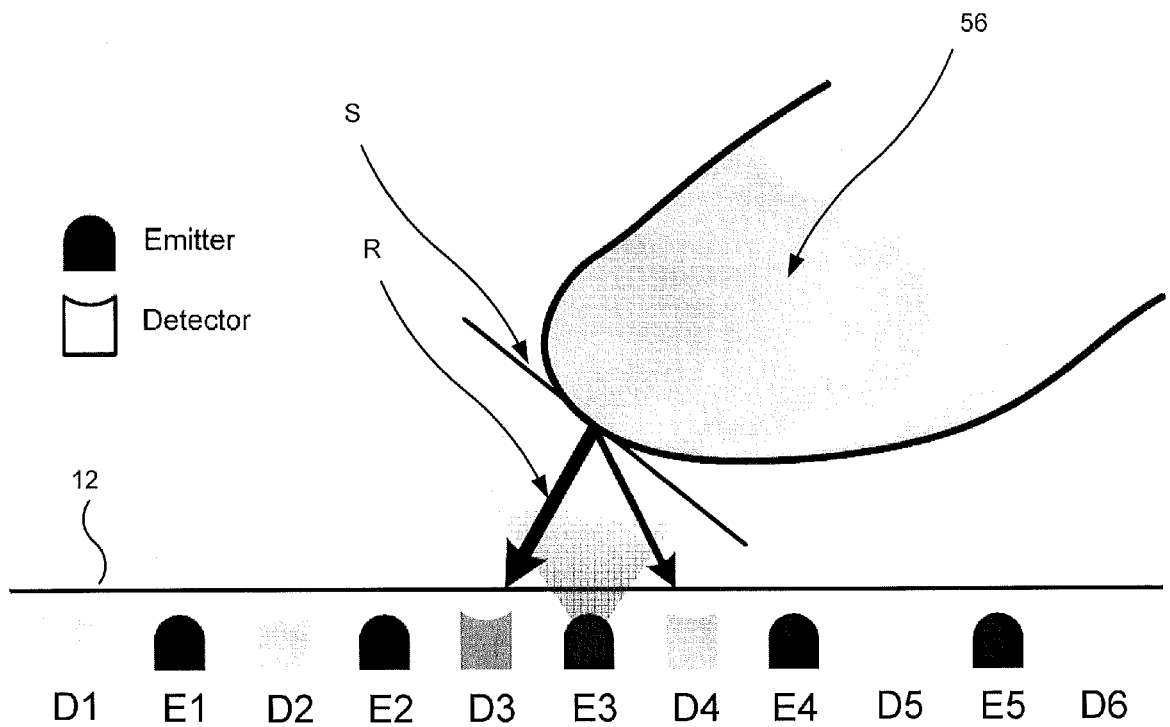
FIGS. 33-34 are schematic side view of the array of FIG. 32 with selected ones of the emitters activated according to some embodiments.

As illustrated in FIG. 33, emitter E3 is activated, and emitters E1, E2, E4 and E5 are deactivated. The detector D3 detects more electromagnetic radiation R than the detector D4, which indicates the angle of the surface of the user input object 56 above the emitter E3. In particular, the surface of the user input object 56 is sloped generally downwards from the detector D3 to the detector D4 from left to right in the region above the emitter E3 as indicated by the surface contour line S of FIG. 33. Accordingly, the slope of the contour of the user input object 56 in a region above the emitter (e.g., emitter E3 in FIG. 33) is generally in a downward direction away from the adjacent detector that detects a greater amount of electromagnetic radiation (e.g., detector D3 detects more radiation than detector D4 and therefore, the slope of the contour of the user input object 56 above the emitter E3 is in a downward direction away from detector D3). In addition, when the detectors D3 and D4 are equidistant from the emitter E3 as illustrated in FIG. 33, the ratio of the detected electromagnetic radiation is generally proportional to the slope of the angle of the contour of the surface of the object 56 above the emitter E3 such that a greater ratio between detector D3 and D4 indicates a greater slope.

Figure 34:
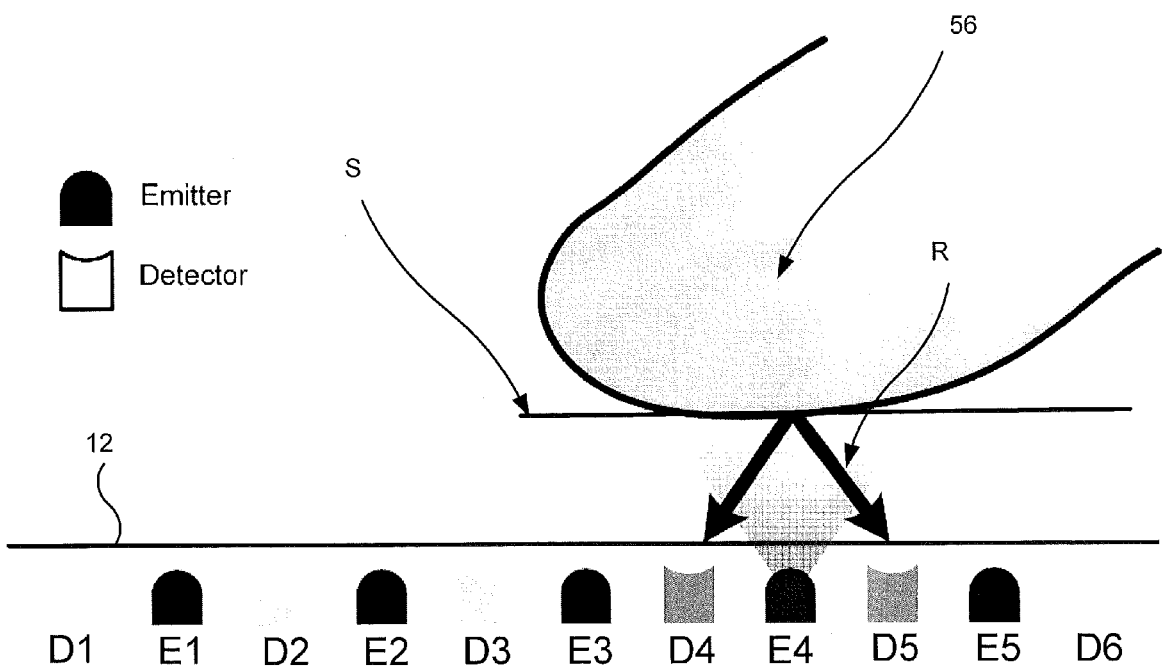

When the emitters E1-E3 and E5 are deactivated and the emitter E4 is activated as illustrated in FIG. 34, then a generally equal amount of electromagnetic radiation R is detected on either side of the emitter E4 by the detectors D4 and D5. This indicates a generally flat surface as indicated by surface contour line S of FIG. 34 of the region of the user input object 56 above the emitter E4. In addition, it should be understood that the amplitude of the electromagnetic radiation detected by the detectors D1-D6 is generally proportional to the distance between the user input object 56 and the display.

Accordingly, different sets of emitters E1-E5 may be activated to determine a general contour profile and/or height profile of the object 56. The contour and/or height profile may be used, for example, to determine a hotspot center location as described herein. For example, the tip of a user's finger may be identified based on the detected contour and/or height profile and known shape characteristics. The tip of the user's finger or other hotspot identifications may be used to define a location on the display that is activated by a particular gesture or command, for example, as discussed with respect to Table 1.

Figure 35:
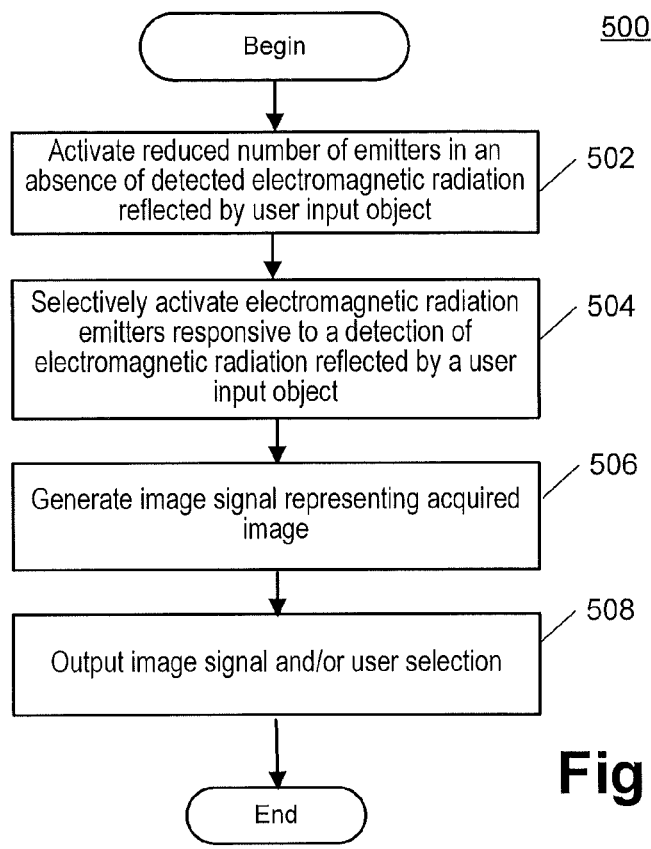
FIG. 35-37 are flowcharts of exemplary operations that may be carried out by the controller according to some embodiments.

The display 12 may be used to display various keypads, including icons or characters, such as on the keyboard 310 of FIG. 17. FIG. 35 is a flowchart of operations 320 that may be carried out by the controller 232, e.g., to identify a user's selection among multiple characters that are displayed on keyboard keys, such as on the keyboard 310 of FIG. 17. Referring to FIGS. 10 and 27-34, the controller 232 can activate a reduced number of electromagnetic radiation emitters E in the pixels 42 on the display 12 in an absence of detected electromagnetic radiation reflected by a user input object (FIGS. 27-29) (Block 502). When a user input object 56 is detected by the electromagnetic radiation detectors D in the pixels 42 on the display 12, the display selectively activates electromagnetic radiation emitters, for example, in the region adjacent the user input object 56 or in the region adjacent a perimeter of user input object 56 (FIGS. 30-31) (Block 504). The display 12 generates an image signal representing an acquired image, e.g., of the user input object 56 (Block 506). The controller 232 may output an image signal and/or a user selection (Block 508).

Figure 36:
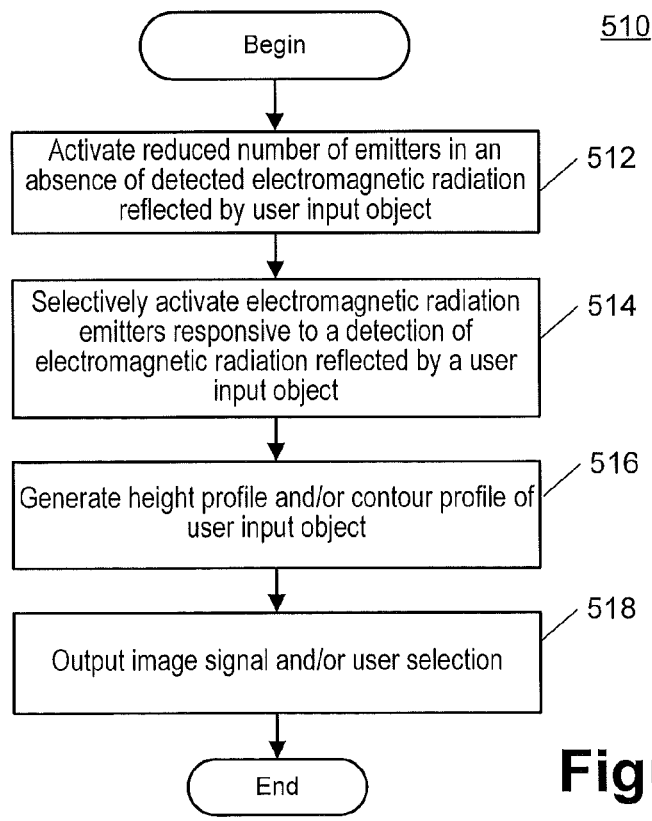

It should be understood that the detected electromagnetic radiation may be used as described herein to identify an image of based on an angular orientation of the user input object 56, the height and/or contour profile of the user input object 56. For example, as illustrated in the flowchart of operations 510 in FIG. 36, the controller 232 can activate a reduced number of electromagnetic radiation emitters E in the pixels 42 on the display 12 in an absence of detected electromagnetic radiation reflected by a user input object (FIGS. 27-29) (Block 512). When a user input object 56 is detected by the electromagnetic radiation detectors D in the pixels 42 on the display 12, the display selectively activates electromagnetic radiation emitters, for example, in the region adjacent the user input object 56 or in the region adjacent a perimeter of user input object 56 (FIGS. 30-31) (Block 514). The display 12 generates a height and/or contour profile of the user input object 56 (Block 516). The controller 232 may output an image signal and/or a user selection based on the height and/or contour profile of the user input object 56 (Block 508). For example, the height and/or contour profile may be used to identify a feature of the user input object 56 such as a finger tip or stylus tip.

Figure 37:
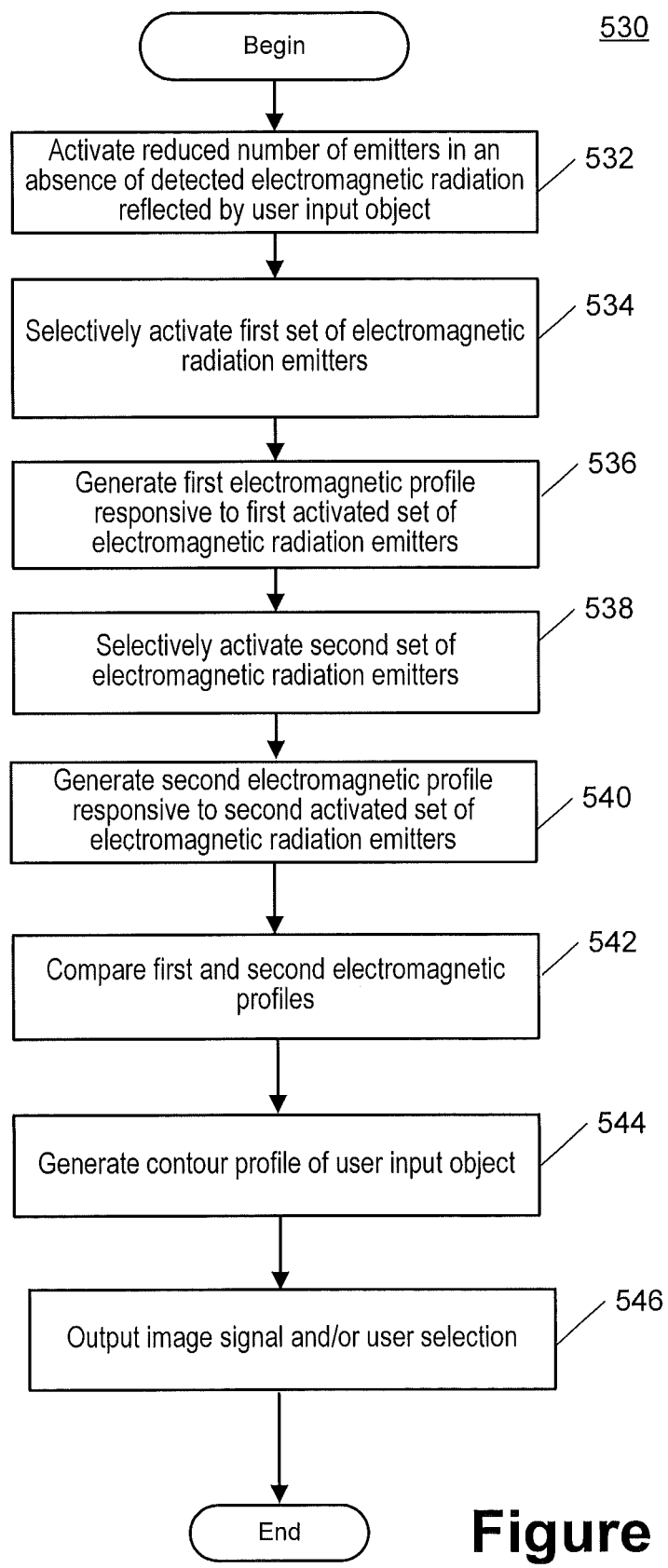

FIG. 37 illustrates a flowchart of operations 530. With reference to FIGS. 29-34, a reduced number of emitters E1-E5 are activated in an absence of detected electromagnetic ration reflected by a user input object (Block 532). In response to a detected user input object 56, first set of one or more of the electromagnetic radiation emitters E1-E5 is activated (Block 534). A first electromagnetic radiation profile is generated responsive to electromagnetic radiation from the first set of one or more electromagnetic radiation emitters E1-E5 that is reflected by the user input object 56 and detected by the array of electromagnetic radiation detectors D1-D6 (Block 536). A second set of one or more of the electromagnetic radiation emitters E1-E5 that is different from the first set of one or more of the electromagnetic radiation emitters E1-E5 is activated (Block 538). A second electromagnetic radiation profile is generated responsive to electromagnetic radiation from the second set of one or more electromagnetic radiation emitters E1-D5 that is reflected by the user input object and detected by the array of electromagnetic radiation detectors E1-E6 (Block 540). A contour profile of the user input object 56 is identified based on the first and second electromagnetic radiation profiles (542). The two electromagnetic radiation profiles are compared (Block 542) and a contour profile of the user input object is generated (Block 544) An image signal and/or user selection is output (Block 546).

Therefore, an image signal and/or user selection of a character or icon on a screen may be determined responsive to the contour profile, height profile, angular orientation, hotspot center identification and/or detecting a contact touch with the screen 12. Gestures and other commands may be identified using the electromagnetic radiation detectors to determine features of a user input device that may not be identifiable in a conventional touch sensitive screen.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A electronic device, comprising:
a touch-sensitive display screen including an array of electromagnetic radiation emitters and electromagnetic radiation detectors, wherein the array of electromagnetic radiation detectors is configured to generate an image signal that represents an image of a user input object that is closely spaced to the display responsive to detected electromagnetic radiation that is reflected by the user input object; and
a controller circuit configured to control activation of the array of electromagnetic radiation emitters so that at least a portion of the array of electromagnetic radiation emitters are inactive in an absence of detecting electromagnetic radiation reflected by the user input object, and to selectively activate ones of the array of electromagnetic radiation emitters responsive to the array of electromagnetic radiation detectors detecting electromagnetic radiation that is reflected by the user input object, wherein the controller circuit is configured to activate a first set of one or more of the electromagnetic radiation emitters and to generate a first electromagnetic radiation profile responsive to electromagnetic radiation from the first set of one or more electromagnetic radiation emitters that is reflected by the user input object and detected by the array of electromagnetic radiation detectors, the controller circuit is configured to activate a second set of one or more of the electromagnetic radiation emitters that is different from the first set of one or more of the electromagnetic radiation emitters and to generate a second electromagnetic radiation profile responsive to electromagnetic radiation from the second set of one or more electromagnetic radiation emitters that is reflected by the user input object and detected by the array of electromagnetic radiation detectors, and the controller circuit is configured to identify a contour profile of the user input object based on the first and second electromagnetic radiation profiles.

2. The electronic device of claim 1, wherein the selectively activated ones of the plurality of the array of electromagnetic radiation emitters are proximate the detected electromagnetic radiation reflected by the user input object.

3. The electronic device of claim 1, wherein the electively activated ones of the plurality of the array of electromagnetic radiation emitters are proximate a perimeter of the electromagnetic radiation reflected by the user input object.

4. The electronic device of claim 1, wherein the controller circuit is configured to generate a contour profile of the user input object that approximates a contour curve of a surface of the user input object and is responsive to an amount of electromagnetic radiation detected by respective ones of the electromagnetic radiation detectors.

5. The electronic device of claim 1, wherein the controller circuit is configured to generate a height profile of the user input object that approximates a distance between a surface of the user input object and the display and is responsive to an amount of electromagnetic radiation detected by respective ones of the electromagnetic radiation detectors.

6. The electronic device of claim 1, wherein the controller circuit is configured to display on the display screen a plurality of keys forming a keyboard and to display characters on the keys, to identify from the first and second electromagnetic radiation profiles a contour profile comprising a contour of the user input object relative to the display screen, to identify a user's selection among characters indicated on the keyboard keys in response to the identified contour profile of the user input object, and to output character data corresponding to the identified user selected character.

7. The electronic device of claim 6, wherein the display is configured to generate a touch signal in response to the display screen being touched by the user input object, and the controller circuit is configured to further identify the user's selection among characters indicated on the keyboard keys in response to a touch signal together with the identified contour profile of the user input object.

8. The electronic device of claim 7, wherein the controller circuit is further configured to display at least two different characters on each of a plurality of the keyboard keys, and to identify a user's selection among the characters displayed on a selected one of the multi-character keys in response to the identified contour profile of the user input object that is selecting the key.

9. The electronic device of claim 8, wherein the controller circuit is further configured to identify a portion of the user input object that is nearest to the display responsive to the contour profile and to identify a first one of the multiple characters on the selected key that occurs adjacent the portion of the user input object that is nearest to the display as being the user selected character.

10. The electronic device of claim 1, wherein the controller circuit is further configured to modify the displayed size of at least some of the keyboard plurality of keys in response to an identified size of the user input object based on the image signal.

11. The electronic device of claim 10, wherein the controller circuit is further configured to display a first plurality of keys of a QWERTY keyboard on the display screen in response to identifying a first threshold size of the user input object and to replace the displayed first plurality of keys with a second plurality of keys of the QWERTY keyboard on the display screen in response to identifying a second threshold size of the user input object, wherein the second threshold size is larger than the first threshold size and the second plurality of keys is less than the first plurality of keys.

12. A method of operating a touch-sensitive display including an array of electromagnetic radiation emitters and electromagnetic radiation detectors, comprising:
  activating a reduced number of electromagnetic radiation emitters in an absence of electromagnetic radiation detected by the electromagnetic radiation detectors;
  selectively activating electromagnetic radiation emitters responsive to a detection of electromagnetic radiation reflected by a user input object;
  generating an image signal representing an acquired image of the user input object;
  identifying a user selection of a character and/or icon responsive to the acquired image of the user input object;
  activating a first set of one or more of the electromagnetic radiation emitters;
  generating a first electromagnetic radiation profile responsive to electromagnetic radiation from the first set of one or more electromagnetic radiation emitters that is reflected by the user input object and detected by the array of electromagnetic radiation detectors;
  activating a second set of one or more of the electromagnetic radiation emitters that is different from the first set of one or more of the electromagnetic radiation emitters;
  generating a second electromagnetic radiation profile responsive to electromagnetic radiation from the second set of one or more electromagnetic radiation emitters that is reflected by the user input object and detected by the array of electromagnetic radiation detectors; and
  identifying a contour profile of the user input object based on the first and second electromagnetic radiation profiles.

13. The method of claim 12, wherein the selectively activated ones of the plurality of the array of electromagnetic radiation emitters are proximate the detected electromagnetic radiation reflected by the user input object.

14. The method of claim 12, wherein the electively activated ones of the plurality of the array of electromagnetic radiation emitters are proximate a perimeter of the electromagnetic radiation reflected by the user input object.

15. The method of claim 12, further comprising generating a contour profile of the user input object that approximates a contour curve of a surface of the user input object and is responsive to an amount of electromagnetic radiation detected by respective ones of the electromagnetic radiation detectors.

16. The method of claim 12, further comprising generating a height profile of the user input object that approximates a distance between a surface of the user input object and the display and is responsive to an amount of electromagnetic radiation detected by respective ones of the electromagnetic radiation detectors.

17. The method of claim 13, further comprising:
    displaying on the display screen a plurality of keys forming a keyboard and characters on the keys;
    identifying a user's selection among characters indicated on the keyboard keys in response to the identified contour profile of the user input object; and
    outputting character data corresponding to the identified user selected character.

18. The method of claim 17, further comprising:
    generating a touch signal in response to the display screen being touched by the user input object;
    identifying the user's selection among characters indicated on the keyboard keys in response to a touch signal together with the identified contour profile of the user input object.

* * * * *